United States Patent
Kurk et al.

[15] 3,700,127
[45] Oct. 24, 1972

[54] METHOD FOR ASSEMBLING LAYERS OF PACKAGES ON A PALLET

[72] Inventors: Kenneth G. Kurk; Robert S. Kilbride, both of Quincy, Ill.

[73] Assignee: Moorman Manufacturing Company, Quincy, Ill.

[22] Filed: Nov. 16, 1970

[21] Appl. No.: 89,658

[52] U.S. Cl. ............... 214/152, 53/187, 198/33 AB, 214/6 DK, 214/6 P
[51] Int. Cl. ............................................. B65g 57/26
[58] Field of Search ............. 214/6 P, 6 H, 6 DK, 6.5; 198/33 AB

[56] References Cited

UNITED STATES PATENTS

| | | | |
|---|---|---|---|
| 2,769,558 | 11/1956 | Ehlers | 198/33 AB X |
| 3,045,802 | 7/1962 | Miller, Jr. | 214/6 P X |
| 3,085,696 | 4/1963 | Stainforth et al. | 214/6 P |
| 3,245,557 | 4/1966 | Maramonte et al. | 214/6 P |
| 3,247,981 | 4/1966 | Johnson | 214/6 P |
| 3,257,006 | 6/1966 | Kampert | 214/6 DK |
| 3,294,257 | 12/1966 | Davies et al. | 198/33 AB |

FOREIGN PATENTS OR APPLICATIONS

| | | | |
|---|---|---|---|
| 1,088,825 | 10/1967 | Great Britain | 214/6 DK |

*Primary Examiner*—Robert J. Spar
*Attorney*—Greist, Lockwood, Greenawalt & Dewey

[57] ABSTRACT

A method and apparatus for arranging bags in layers with the sewn end of each bag in each layer facing inwardly of the layer and for depositing each layer on a pallet. Some bags are turned 180 and some bags are turned 90 while the bags are being conveyed to a marshalling station where the bags are gathered sequentially in groups. The first two groups are sequentially moved onto a plate to form a layer of bags having a predetermined pattern. Then, the plate is moved over a pallet and the layer is wiped off the plate over the pallet while the plate is retracted. The next two groups are arranged in a layer having a different pattern and deposited over the pallet in like manner. These steps are repeated several times to quickly deposit eight layers on the pallet with adjacent layers having interlocking patterns. Preferably, 90 turning of a bag is accomplished by blocking movement of the bag on one side near one end while quickly moving a guide member along the other side of the bag toward the other end and then quickly retracting the guide member.

5 Claims, 22 Drawing Figures

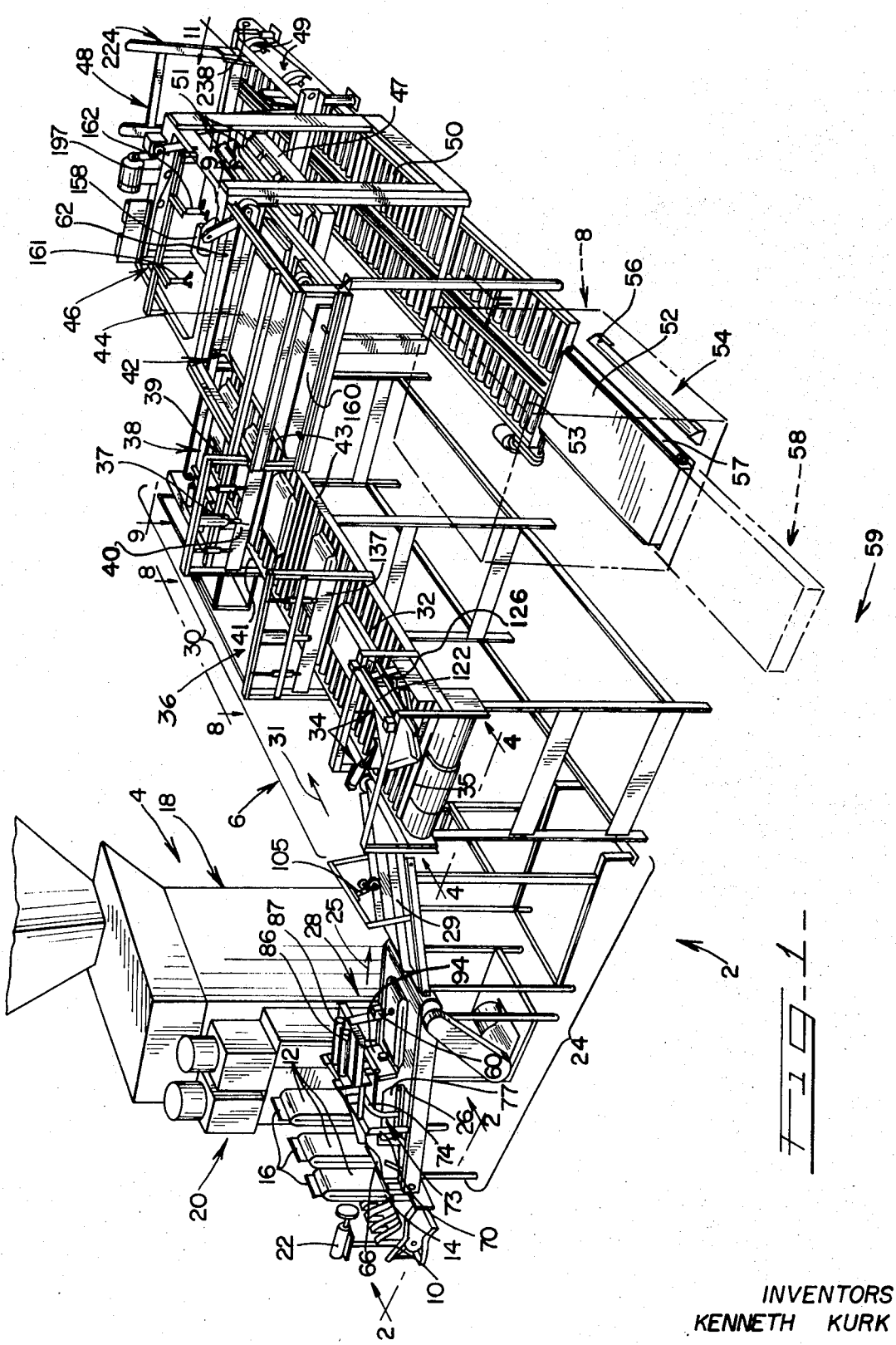

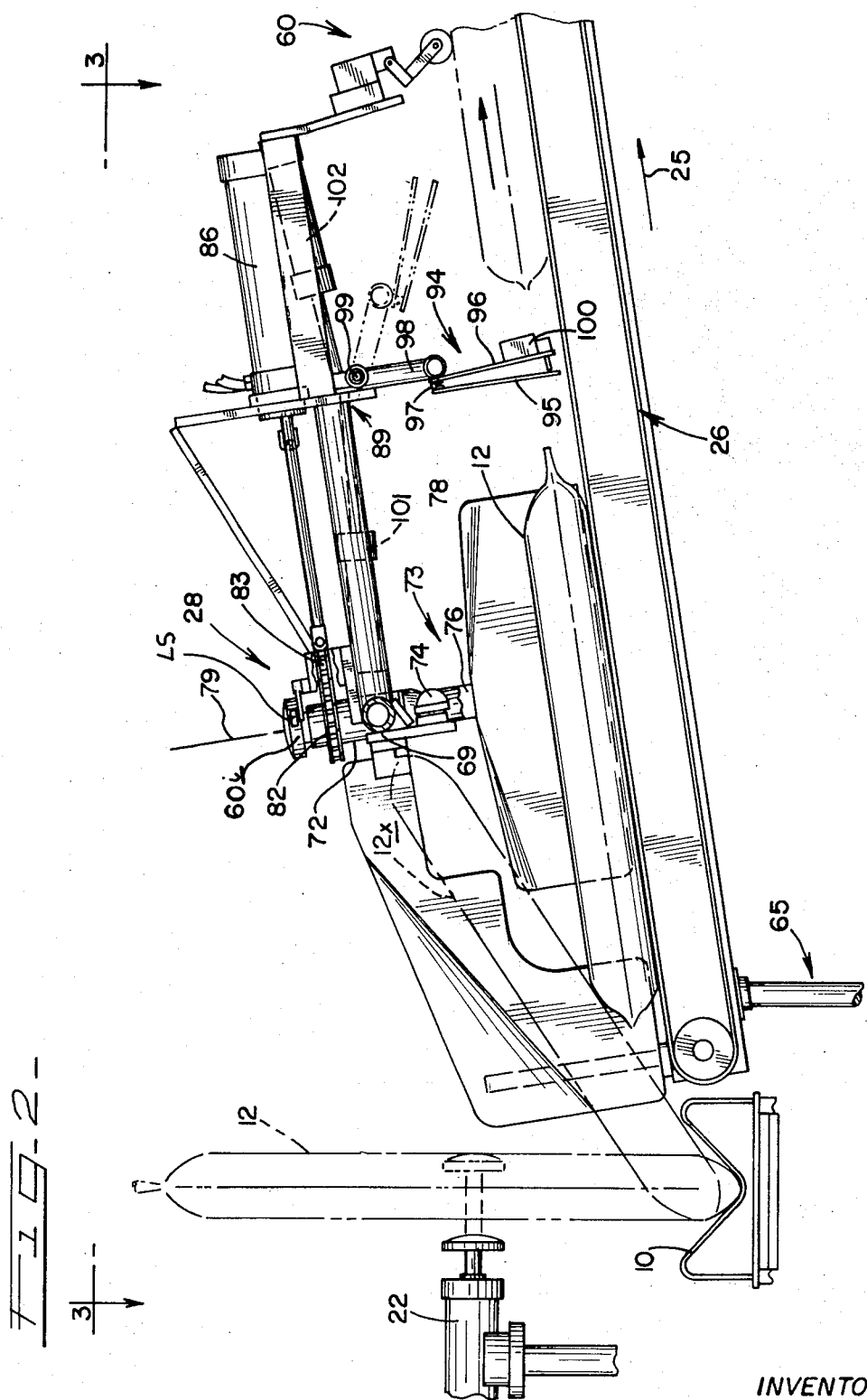

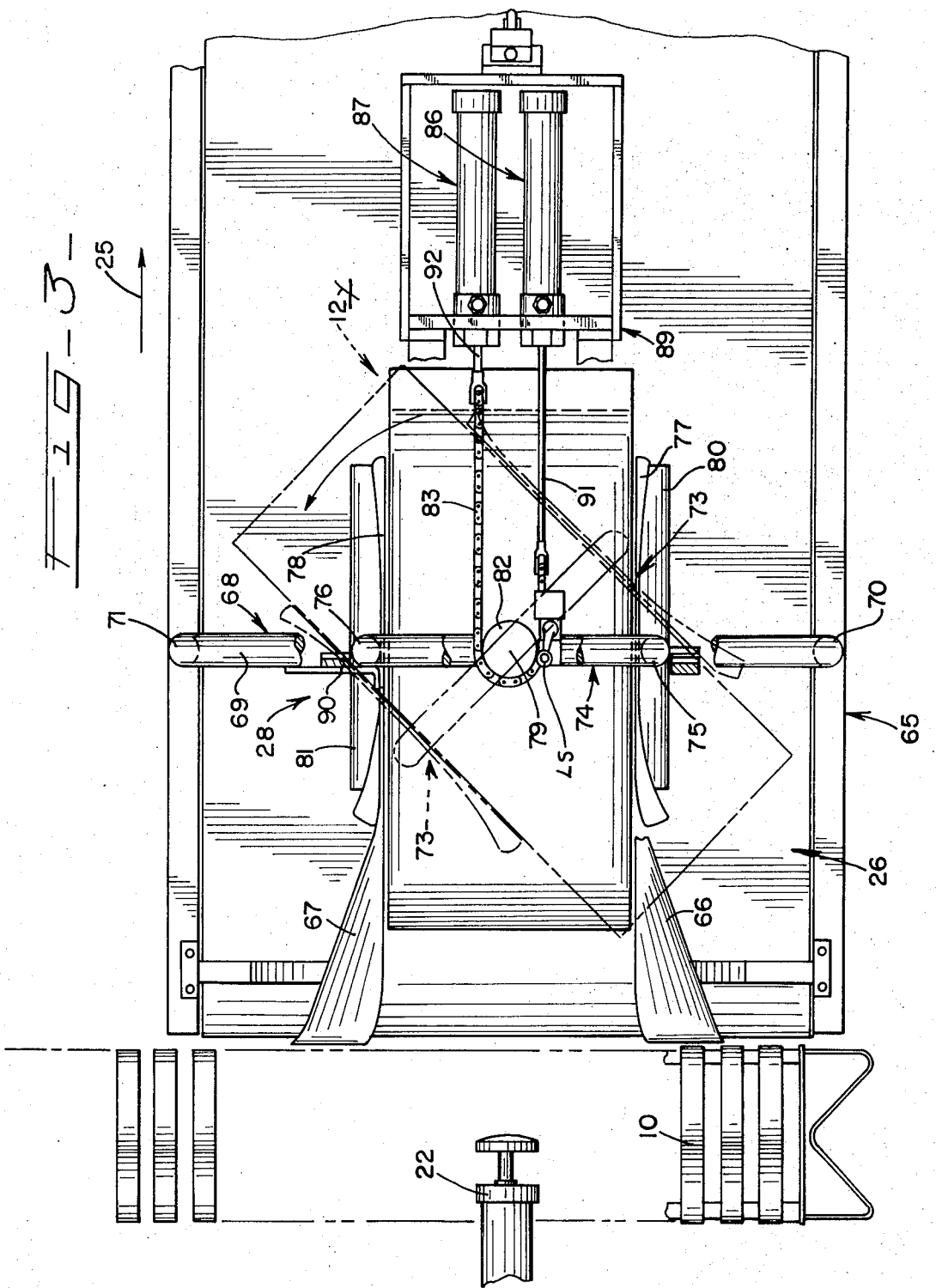

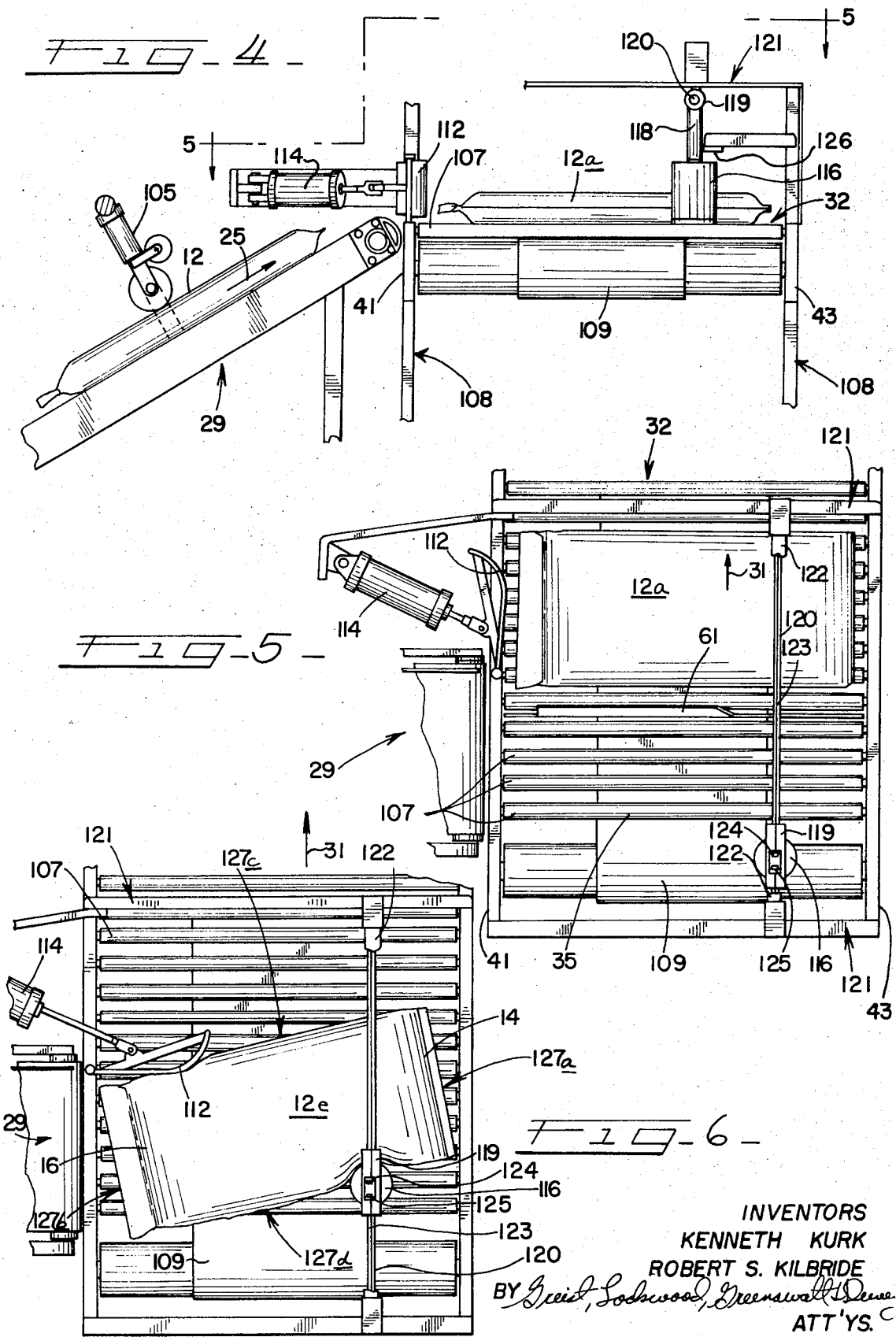

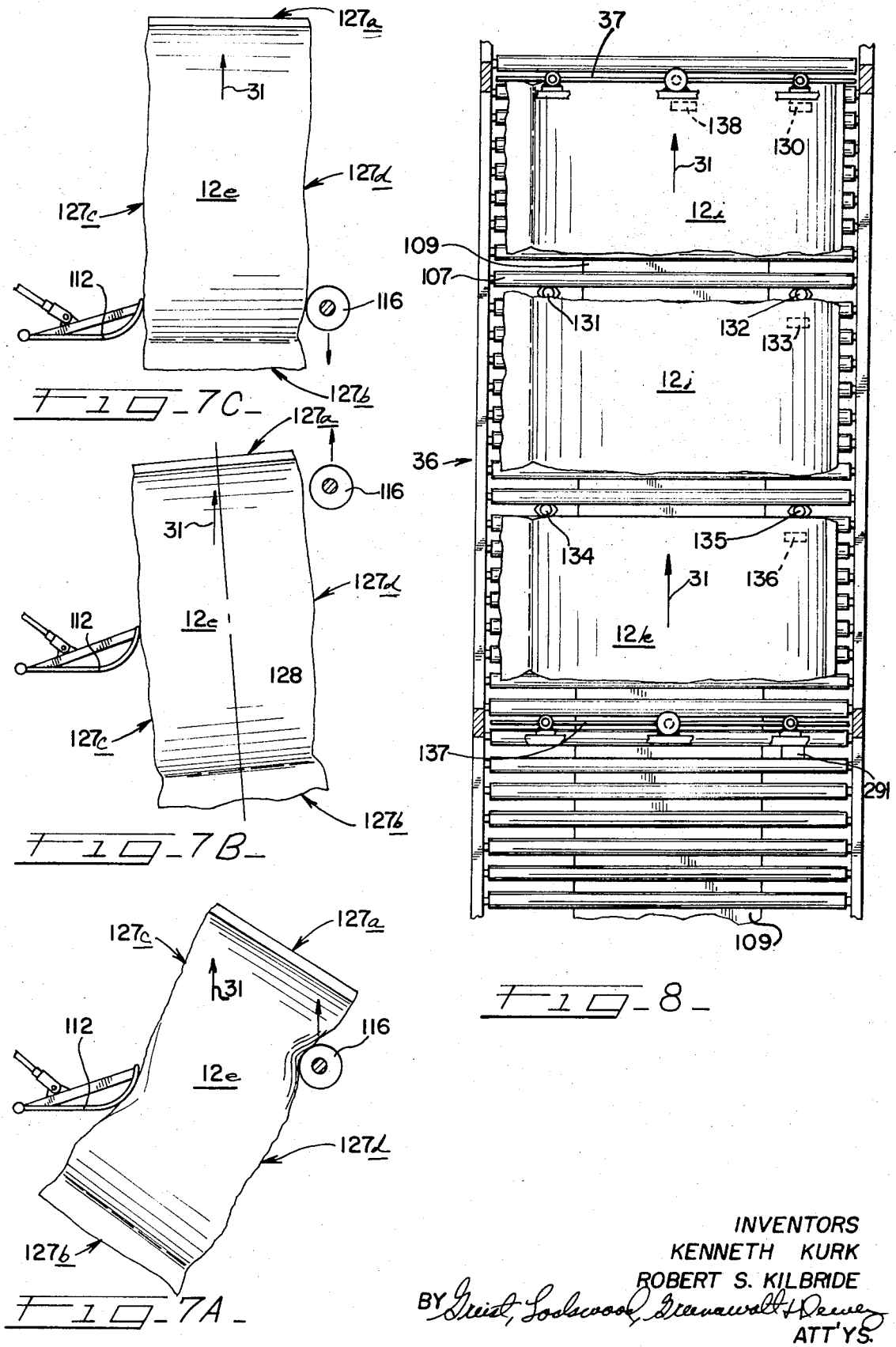

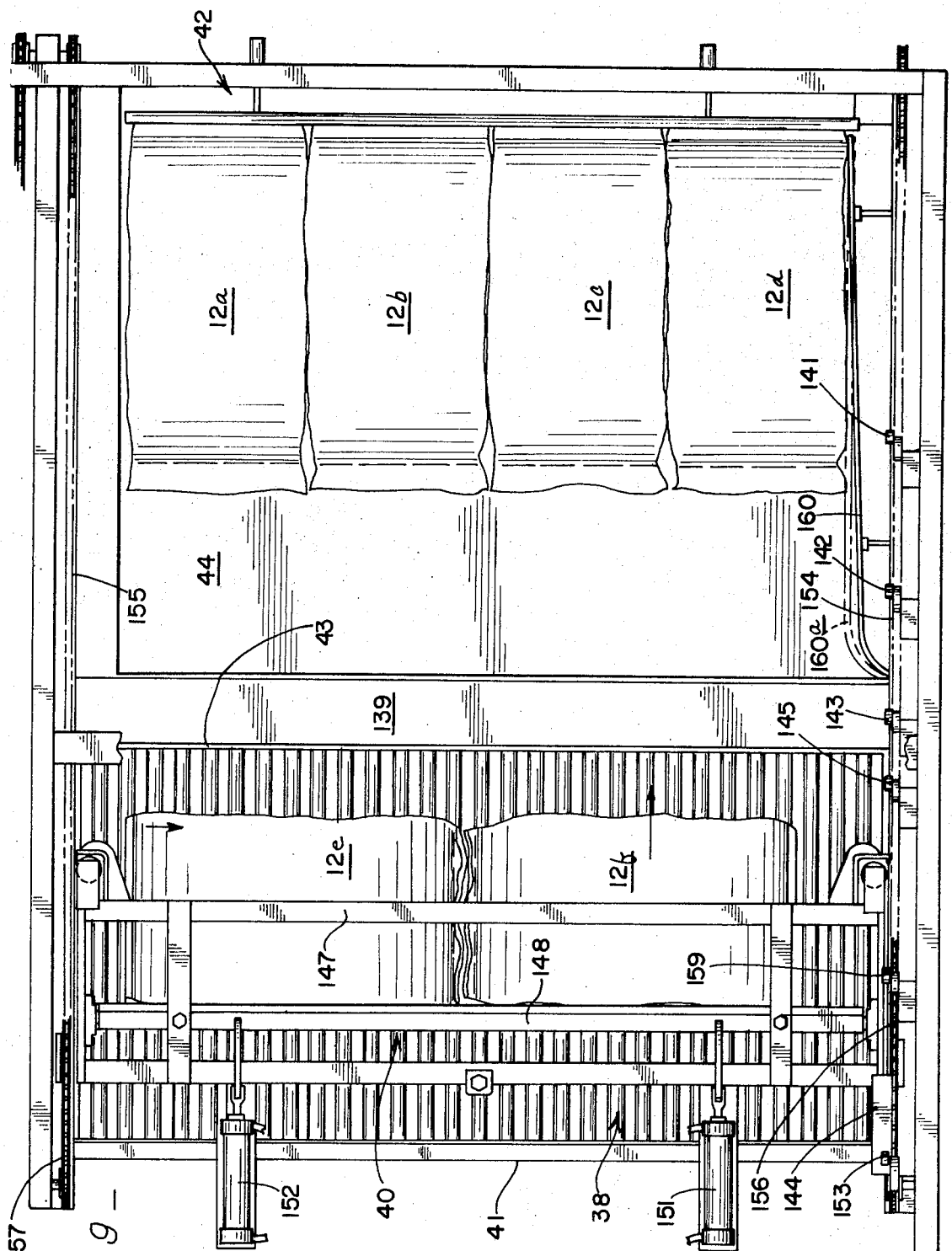

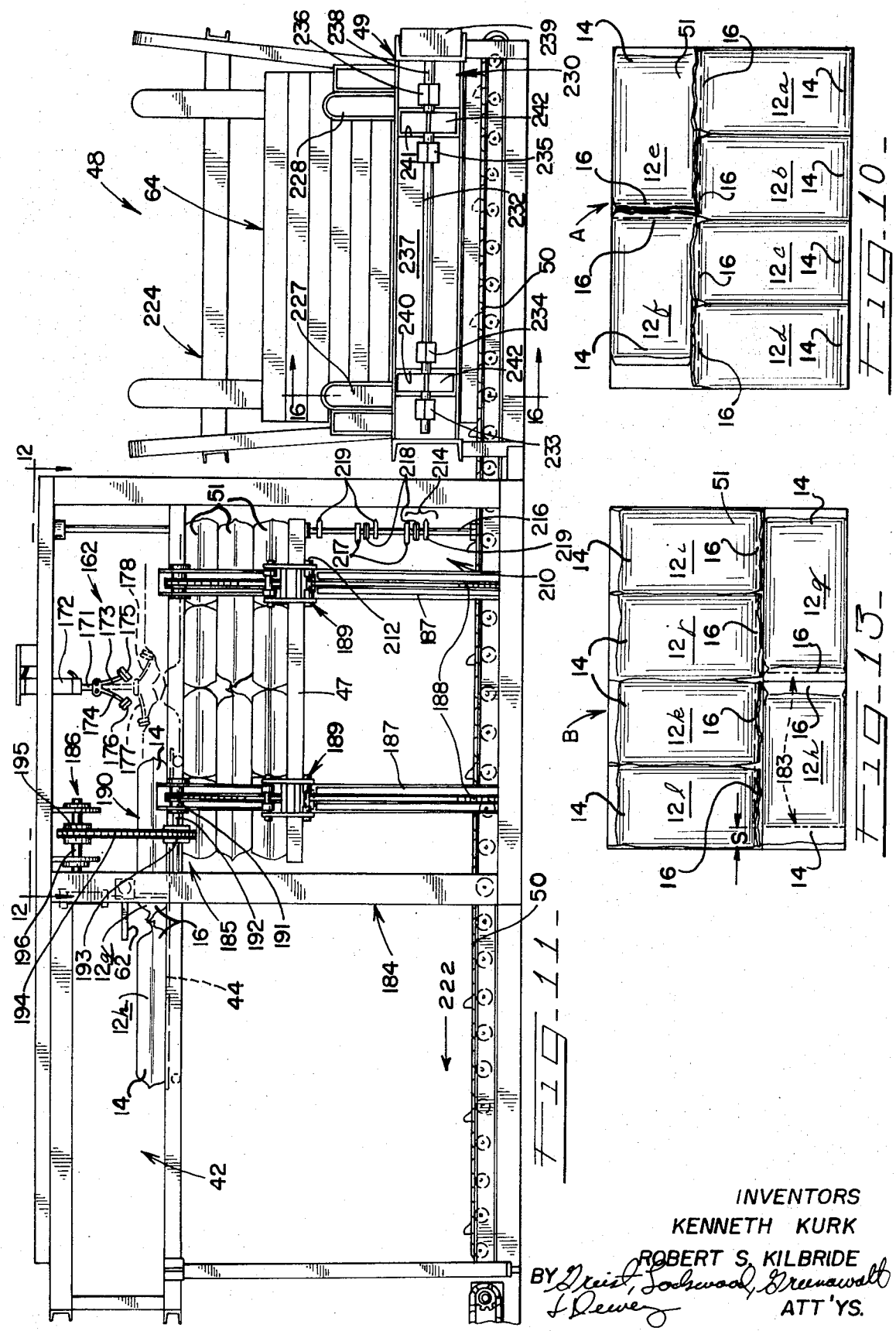

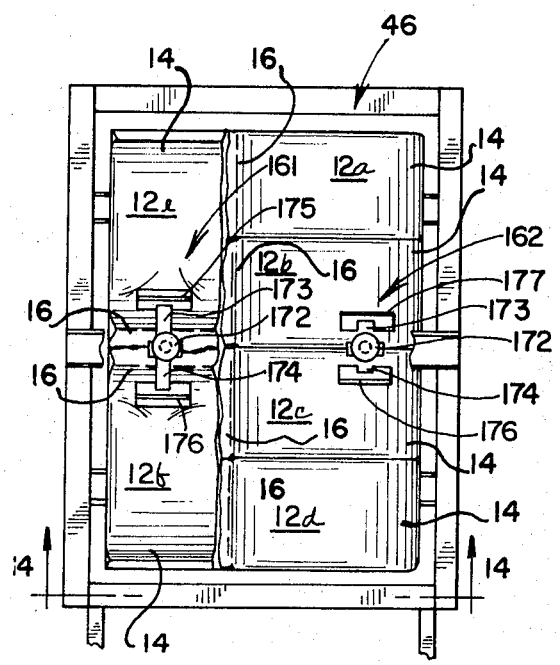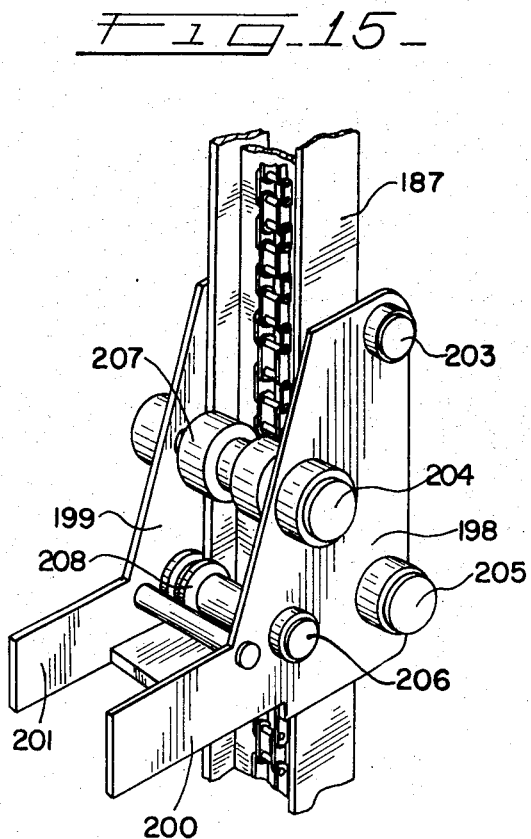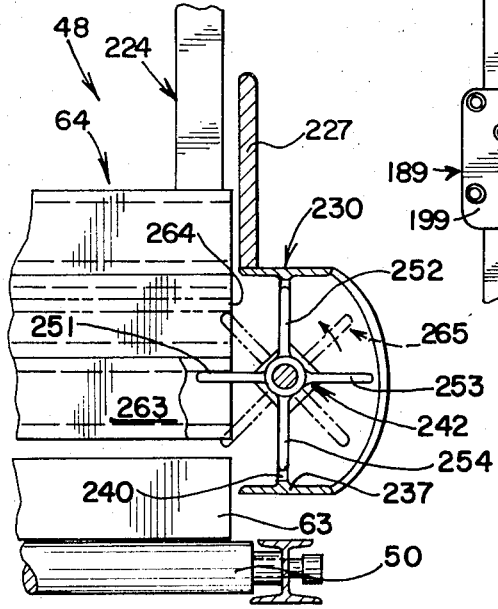

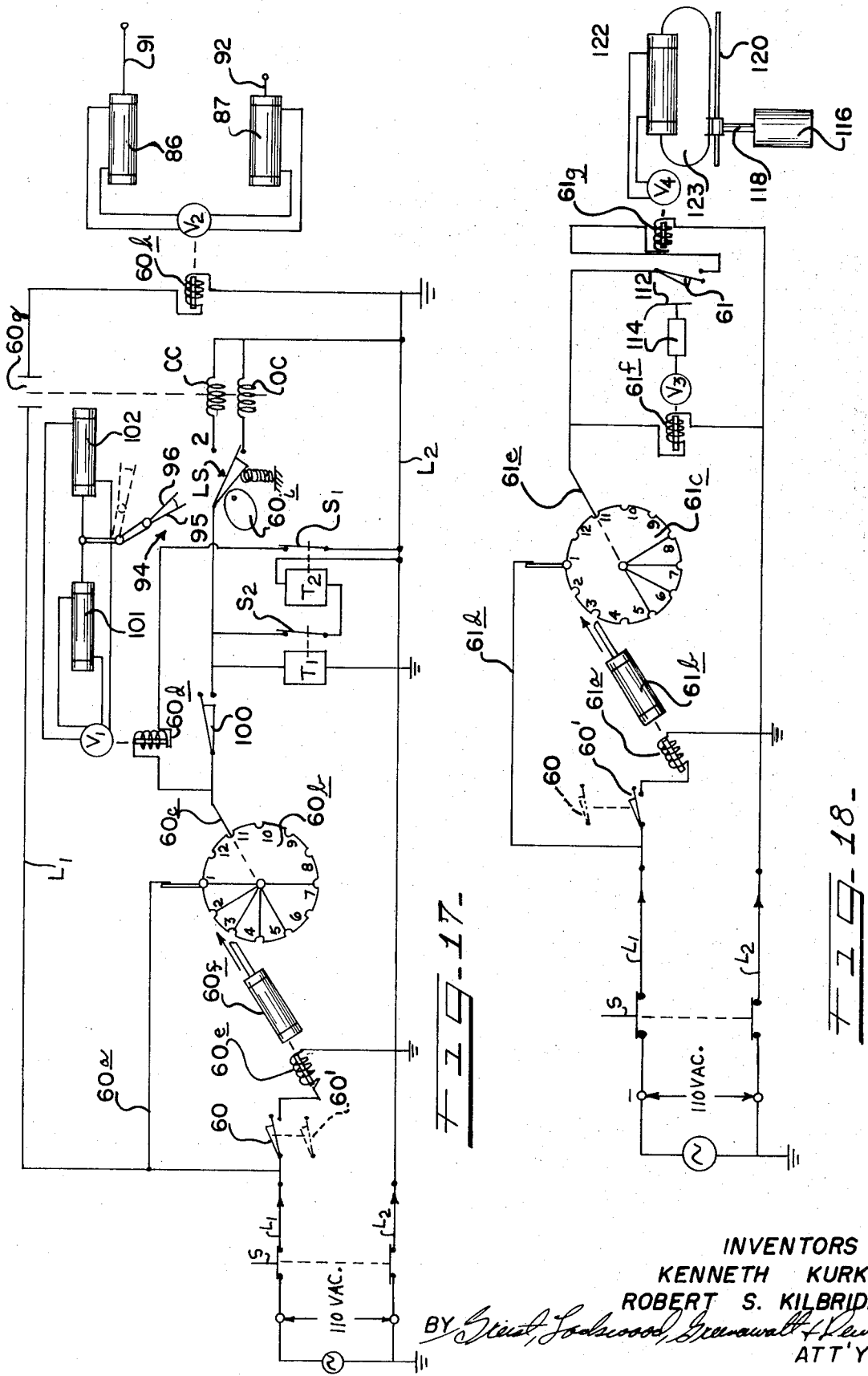

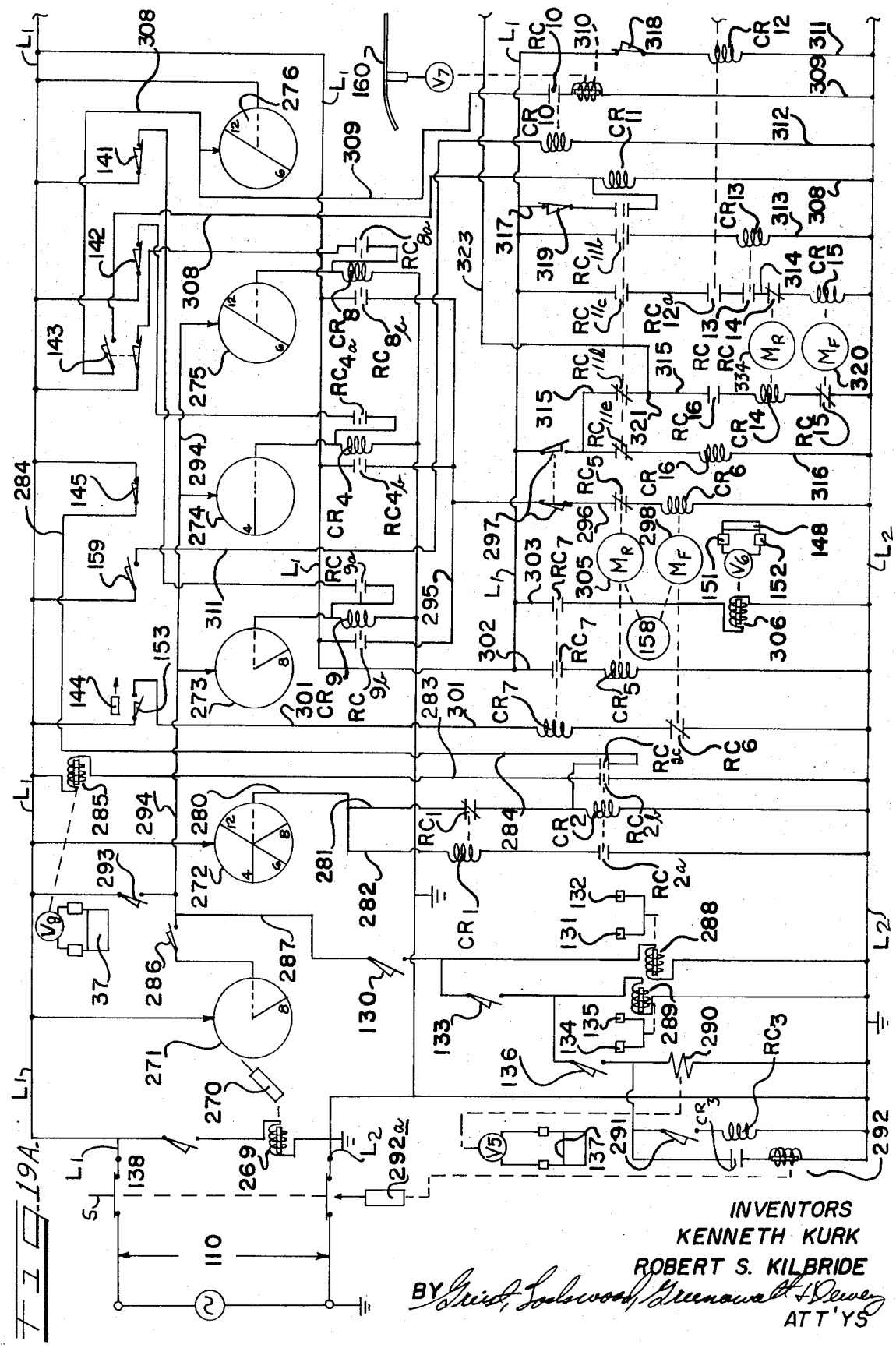

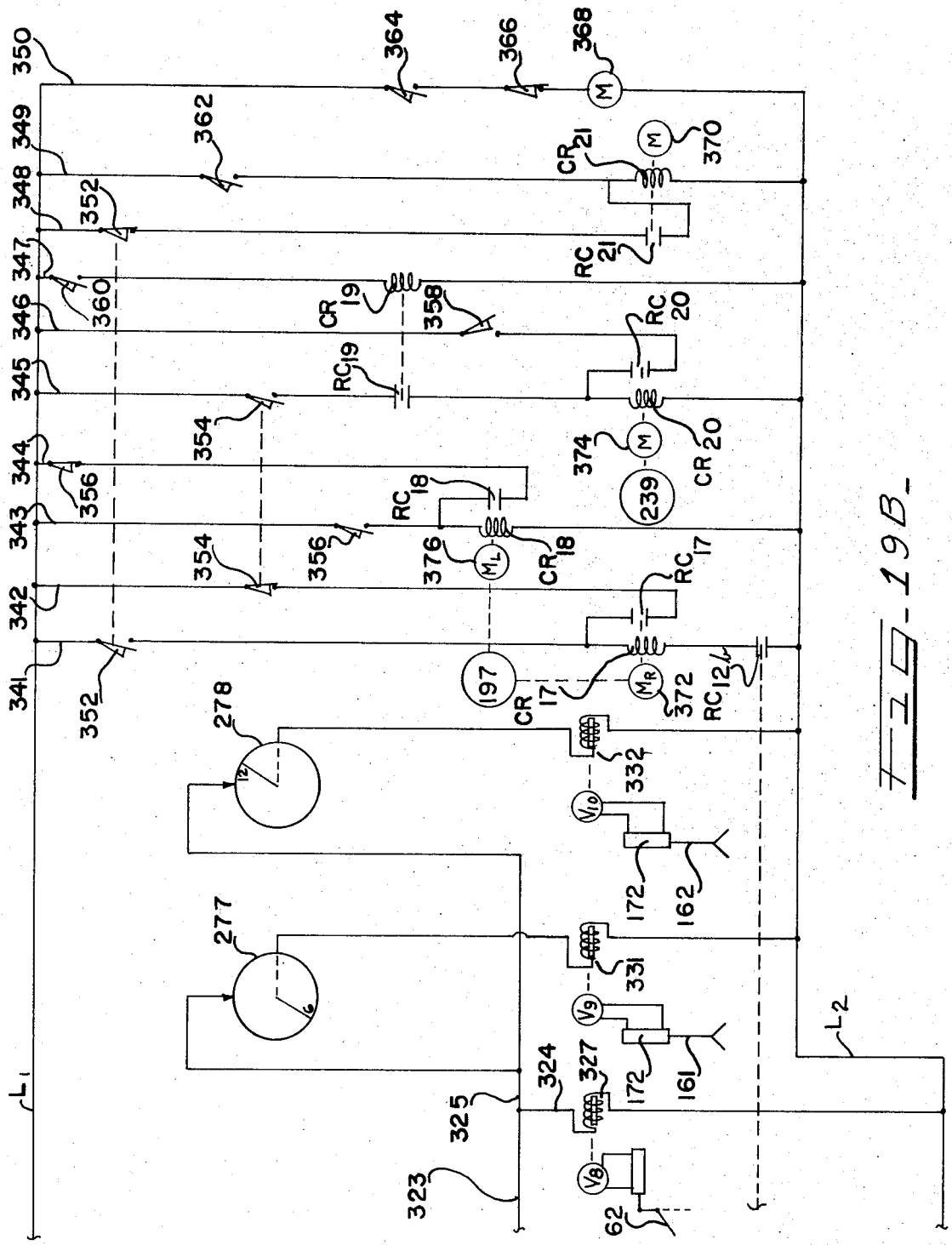

METHOD FOR ASSEMBLING LAYERS OF PACKAGES ON A PALLET

The present invention relates to improvements and innovations in a method and apparatus for assembling layers of filled containers or packages on a pallet. More particularly, the present invention relates to a method for quickly and efficiently assembling layers of bags on a pallet with the bags in each layer having a predetermined orientation for interlocking with adjacent layers, and preferably with a specified end of each bag in each layer facing inwardly of the layer, and to an apparatus, hereinafter referred to as an automatic palletizer, for assembling the layers of bags on the pallet with the desired orientation of each bag in each layer.

Heretofore, a variety of devices have been proposed for arranging layers of packages on a pallet with the packages in each layer having a predetermined orientation. Some of these known devices are primarily used for arranging bags into layers, each layer being formed with one group of two packages extending end to end and with another group of three or more packages arranged side by side, and the patterns of adjacent layers being in opposite hand relation to each other so that each package in one layer contacts two packages in an adjacent layer. In this way, a frictional interlocking between adjacent layers is obtained. One known device for assembling bags in this manner is disclosed in U.S. Pat. No. 2,813,638 issued to F. H. Miller Jr. on Nov. 19, 1957.

Palletizing devices of this type are useful in plants, such as an animal feed processing plant, where bags are continuously being filled and closed and then are stacked on pallets for temporary storage. In such plants it is common to use a machine for continuously filling and closing the bags. In one such machine, the bags exit from the machine in upright position on a continuous conveyor, at a rate of approximately 20 bags per minute, and a difficulty encountered with the presently known palletizing devices is the inability of these known devices to handle bags at a rate of approximately 20 bags per minute.

Moreover, another difficulty encountered with the known devices is the inability of these known devices to stack layers of bags on a pallet with a specified end of each bag extending inwardly of the layer. This is important where the specified end is the closed or sewn end which has a loose thread end serving as a draw string and it is desirable to arrange the bags on the pallet in layers with the sewn end of each bag in each layer facing inwardly of each layer to prevent premature opening of the bag by accidental or intentional pulling of the draw string.

Additionally, another difficulty encountered with the known devices is the inability of these known devices to stack layers of bags on a pallet where the dimensions or extent of the pallet is less than the dimensions or extent of the layers, that is to say, where the outer margin of the bottom layer of bags extends over the edges of the pallet.

In many instances, the size of the bags is such that the longitudinal extent of two bags arranged end to end is less than the lateral extent of a plurality of bags arranged side by side. In these instances, it is desirable that some means be provided for separating the two bags arranged end to end in the layer so that the outer ends of these two bags will be aligned with the outer sides of the respective two bags of the plurality of bags arranged side by side to "square" the corners of each layer with the corners of the adjacent layers and thereby provide a more stable stack of layers on a pallet.

Still another difficulty encountered with presently known palletizing devices is the inability of these devices to "square" the corners of layers formed of bags having the above described length to width relationship.

Additionally it is desirable to provide some means for wrapping the layers on the pallet to protect the same from the elements and to further stabilize the stacked pallet and thereby inhibit, if not prevent, toppling of the layers or shifting of the bags in each layer during subsequent handling of the stacked pallet. In this respect, it is desirable that the palletizing device be capable of being combined with a conventional shrink wrap mechanism so that stacked pallets can be wrapped with a plastic material subsequent to the stacking of layers on the pallet and prior to the moving of the stacked pallet to a storage area.

In view of the above described difficulties encountered with the known methods and devices for assembling packages in layers on a pallet, it is a primary object of the present invention to provide a method for rapidly and quickly assembling layers of filled containers on a pallet with the filled containers in each layer having a predetermined orientation.

Another object of the present invention is to provide a method for assembling layers of packages on a pallet at a rate of at least twenty packages per minute and with the packages in each layer arranged in a predetermined pattern.

Another object of the present invention is to provide a method for assembling elongated packages having a first end and a second end on a pallet with the packages in each layer having a predetermined orientation and with the first end of each package in each layer facing inwardly of the layer.

Another object of the present invention is to provide a method for assembling layers of packages on a pallet with the packages in each layer arranged in a predetermined pattern, and in which selected packages are turned 180° while the packages are being fed to a marshalling station.

Another object of the present invention is to provide a method for assembling layers of elongated packages on a pallet with the containers in each layer arranged in a predetermined pattern and for "squaring" the corners of each layer where the longitudinal extent of two packages abutting each other end to end in each layer is less than the lateral extent of other packages arranged side by side in the layer.

Another object of the present invention is to provide a method for assembling layers of elongated containers on a pallet with the containers in each layer arranged in a predetermined pattern and in which selected packages are quickly turned 90° while the packages are being fed to a marshalling station.

Another object of the present invention is to provide an apparatus for rapidly assembling layers of packages on a pallet with the packages in each layer each having a predetermined orientation.

Another object of the present invention is to provide an apparatus for assembling layers of bags on a pallet with the bags in each layer each having a predetermined orientation, and with the outer margins of the layers overlapping the edges of the pallet.

Another object of the present invention is to provide an apparatus for assembling layers of packages on a pallet at the rate of at least about twenty packages per minute, with each package in each layer having a predetermined orientation and with the packages in each layer arranged in a predetermined pattern.

Still another object of the present invention is to provide an apparatus for assembling bags, each having a sewn end and a butt end, in layers on a pallet with the bags in each layer having a predetermined orientation and with the sewn end of bag in each layer facing inwardly of the layer.

The method of the present invention achieves many of the above objects with the steps of: conveying packages in a first direction with each package oriented in a given direction; conveying the packages in a second direction to a marshalling station; turning selected packages while conveying the same in the second direction; sequentially gathering groups of the packages at said marshalling station; moving the first group of packages gathered at the marshalling station onto a plate while it is in a first position; moving the second group of packages gathered at the marshalling station onto the plate while it is in the first position to form a layer of packages arranged in a predetermined pattern; moving the plate with the layer thereon to a second position over a pallet; and wiping the layer off of the plate while retracting the plate to the first position to deposit the layer on the pallet. The above steps can be repeated a number of times to deposit a number of layers on the pallet with the packages in each layer arranged in a predetermined pattern which facilitates interlocking of each layer with an adjacent layer.

The method of the present invention achieves other of the above objects with the step of turning selected packages substantially 280° while conveying the packages in the first direction.

The apparatus of the present invention achieves still other of the above objects with an automatic palletizer including: a first conveying mechanism for receiving packages with each package oriented in a given direction and for sequentially conveying the packages in a first direction; a second conveying mechanism for receiving packages from the first conveying mechanism and for conveying the same in a second direction; a turning mechanism operatively associated with the second conveying mechanism for turning selected packages while they are being conveyed on the second conveying mechanism; the second mechanism including a marshalling station located downstream from the turning mechanism for receiving and grouping the packages; a layer forming and shuttling station located adjacent the marshalling station and including a shuttle plate; a pusher device for sequentially moving each group of packages from the marshalling station onto the shuttle plate and thereby arrange the packages on the shuttle plate in a layer with the packages in the layer arranged in a predetermined pattern; a pallet elevator mounted adjacent the layer forming and shuttling station and including a mechanism for raising a pallet in the elevator to a predetermined height for receiving a first layer of packages; the layer forming and shuttling station including a mechanism for moving the shuttle plate with a layer of packages thereon over the pallet in the pallet elevator; a mechanism for wiping the layer off of the shuttle plate to deposit the layer on the pallet elevator as the shuttle plate is retracted to the layer forming and shuttling station; the pallet elevator including a mechanism for lowering the pallet in the pallet elevator a predetermined distance after a layer has been deposited on the pallet; and a mechanism for moving a loaded pallet from the pallet elevator after a predetermined number of layers have been deposited on the pallet elevator and for simultaneously moving an empty pallet to the pallet elevator.

The exact manner in which the present invention achieves the above objects, and other objects and advantages inherent in the invention will become more apparent from the following detailed description of a preferred embodiment of the invention taken in conjunction with the accompanying drawings wherein:

FIG. 1 is a perspective view of the automatic palletizer of the present invention combined with a bag filling and closing machine and a shrink wrap mechanism for wrapping a plastic material around a loaded pallet;

FIG. 2 is a side elevational view, with portions removed, taken along line 2—2 of FIG. 1, and showing a 180° turning mechanism located in a first feeding zone of the palletizer;

FIG. 3 is a top plan view, with portions broken away, taken along line 3—3 of FIG. 2;

FIG. 4 is a side elevational view taken along line 4—4 of FIG. 1, and showing a 90° turning mechanism located in a second feeding zone of the palletizer;

FIG. 5 is a top plan view, with portions broken away, taken along line 5—5 of FIG. 4;

FIG. 6 is a view similar to the view shown in FIG. 5, and showing the 90° turning mechanism operated to begin turning a bag 90°;

FIG. 7A, 7B and 7C are fragmentary top plan views similar to the view shown in FIG. 6, and showing sequential positions of a bag as it is being turned 90° by the 90° turning mechanism;

FIG. 8 is a fragmentary top plan view taken along line 8—8 of FIG. 1 and showing a holding area in the second feeding zone for holding three bags;

FIG. 9 is a top plan view, with portions broken away, taken along line 9—9 of FIG. 1 and showing a marshalling station at the downstream end of the second feeding zone, a layer forming and shuttling station located adjacent the marshalling station, and a group of bags being moved by a pusher device onto a shuttle plate in the layer forming and shuttling station;

FIG. 10 is a top plan view of the layer being formed in FIG. 9;

FIG. 11 is a side elevational view, with portions broken away, taken along line 11—11 of FIG. 1 and showing the layer forming and shuttling station, a pallet elevator, a pallet dispenser, and a pallet conveyor, of the palletizer;

FIG. 12 is a top plan view, with portions broken away, taken along line 12—12 of FIG. 11, showing a layer having another predetermined pattern, which is in opposite hand relation to the pattern shown in FIG. 10, as it is being wiped off the shuttle plate to deposit the layer over a pallet in the pallet elevator, and showing spreading mechanisms for spreading apart the two bags arranged end to end in the layer;

FIG. 13 is a top plan view of a layer, having the pattern shown in FIG. 12, after it has been deposited on the pallet in the pallet elevator and the two bags extending end to end in the layer have been separated to "square up" the corners of these two bags with the outer corners of the outer two bags of the other bags arranged side by side in the layer;

FIG. 14 is a sectional view, with portions broken away, taken along line 14—14 of FIG. 12, and showing the lift mechanism for lifting and supporting a pallet in the pallet elevator;

FIG. 15 is an enlarged perspective view of one lift member of the lift mechanism shown in FIG. 14;

FIG. 16 is a sectional view, with portions broken away, taken along line 16—16 of FIG. 11, and showing one of the star wheel feeding members of the pallet dispenser for depositing pallets sequentially and individually on the pallet conveyor;

FIG. 17 is a schematic diagram of the electrical circuit for controlling operation of the 180° turning mechanism shown in FIGS. 1, 2 and 3;

FIG. 18 is a schematic diagram of the electrical circuit for controlling operation of the 90° turning mechanism shown in FIGS. 1 and 4—7C; and FIGS. 19A and 19B, taken together, show a schematic diagram of the electrical circuits for controlling operation of the pusher device shown in FIGS. 1 and 9, the shuttle plate shown in FIGS. 1, 9 and 11, the pallet elevator shown in FIGS. 1 and 11, the spreading devices shown in FIGS. 1, 11 and 12, the pallet dispenser shown in FIGS. 1, 11 and 16, the pallet conveyors shown in FIGS. 1 and 11.

Referring now to the drawings in greater detail, a bag handling system 2 is shown in FIG. 1 and includes a bag filling and closing machine, generally indicated at 4, the automatic palletizer of the present invention, generally indicated at 6, and a shrink wrap mechanism generally indicated in phantom lines at 8. The system 2 fills and seals bags, arranges the bags on a pallet in eight layers with each layer having a predetermined pattern, and then shrink wraps a plastic material around the loaded pallet to provide a stable wrapped pallet with eight layers of bags. In the illustrated embodiment, each layer is formed with one of two interlocking patterns, A or B, which are in opposite hand relation to each other; and adjacent layers have alternate patterns. The two patterns A and B are best shown in FIGS. 10 and 13, respectively, and will be described in detail in connection with the description of FIGS. 10 and 13.

The bag filling and closing machine 4 and the shrink wrap mechanism 8 are of known construction. The automatic palletizer 6 can be used by itself, or in combination with the machine 4 and/or the shrink wrap mechanism 8.

The bag filling and closing machine 4 includes a continuous conveyor 10 for carrying bags 12 in a generally upright position. In this respect, a closed bottom or butt end 14 of each bag 12 is supported on the conveyor 10. Although not shown, it will be understood that the upper end 16 of each bag is initially open for receiving material which is dispensed into the bag by a filling mechanism generally indicated at 18. Downstream from the filling mechanism 18 is a closing or sealing mechanism, generally indicated at 20, where the upper end 16 of each bag 12 is closed after the bag 12 is filled, typically by sewing the upper end 16 of the bag 12. Thereafter, the bag 12 is carried further downstream by the conveyor 10 to a position where a kicker 22 is located. When the bag 12 is opposite the kicker 22, the kicker 22 is operated to kick the bag 12, sewn end first, into a first feeding zone 24 of the palletizer 6.

The general construction of the palletizer 6 will now be described with reference to FIG. 1.

As shown, the first feeding zone 24 of the palletizer 6, wherein the bags 12 are fed in a first direction indicated by the arrow 25, includes a first conveyor 26, a 180° turning mechanism 28 associated with the first conveyor 26 for turning selected bags 12, 180°, and a second inclined, high speed conveyor 29 which sequentially delivers the bags 12 to a second feeding zone 30.

The second feeding zone 30, in which the bags 12 are fed in a second feeding direction, indicated by the arrow 31, 90° to the first direction, includes a live bottom roller conveyor 32, a 90° turning mechanism 34 at the upstream end 35 of the conveyor 32 for turning selected bags 12, 90°, and a bag holding area 36 which is separated by a vertically reciprocal gate 37 from a marshalling station 38 located within the second feeding zone 30 at the downstream end 39 of the conveyor 32. A pusher device 40 is normally positioned on one side 41 of the conveyor 32 and in position to push bags gathered in a group at the marshalling station 38 off of the conveyor 32 into a layer forming and shuttling station 42 which is located adjacent the other side 43 of the conveyor 32 and which includes a shuttle plate 44 on which first and second (and third and fourth) groups of bags 12 are arranged to form a layer of bags 12 having a pattern A (a pattern B) as shown in FIG. 10 (FIG. 13).

A pallet elevator 46 is located adjacent one side of the layer forming and shuttling station 32, and the shuttle plate 44 is arranged for movement from a first position in the layer forming and shuttling station 42 to a second position within the pallet elevator 46 for depositing a layer of bags 12 from the shuttle plate 44 onto a pallet 47 in the pallet elevator 46.

A pallet supply station 48 including a pallet dispenser 49 is located adjacent the pallet elevator 46 opposite the layer forming and shuttling station 42. A pallet conveyor 50 extends through the pallet supply station 48 and the pallet elevator 46, and through the layer forming and shuttling station 42 beneath the shuttle plate 44. In this illustrated embodiment, four layers 51 are shown deposited on the pallet 47 in the pallet elevator 46.

As shown in FIG. 1, another conveyor 52 is situated at the downstream end 53 of the conveyor 50. It will be understood that the loaded pallets are moved from the conveyor 50 onto the conveyor 52 during the operation of the palletizer 6. In the illustrated embodiment, the conveyor 52 is a powered conveyor and defines a pick up station 54 for receiving and holding loaded pallets (not shown) received from the conveyor 50 until they are picked up by fork lift trucks (not shown) which are used to move the loaded pallets to a storage area (not shown). To prevent a fork lift truck from engaging and damaging the conveyor 52, a guard rail 56 is positioned along the outer side 57 of the conveyor 52.

In another embodiment of the invention, the conveyor 52 is also powered and forms part of a conveyor mechanism, indicated by phantom lines at 58, of the shrink wrap mechanism 8. In this other embodiment of the invention, the pick up station will be located downstream of the conveyor mechanism 58 as indicated generally at 59.

The general operation of the system 2 will now be described with reference to FIGS. 1, 10 and 13.

As described above, the bags 12 are sequentially filled and closed by the filling and closing machine 4. When each bag 12 reaches the position adjacent the kicker 22, the kicker 22 is operated to push each bag 12, sewn end first, onto the conveyor 26 in the first feeding zone 24 with each bag 12 aligned on the conveyor 26 with its longitudinal axis extending generally parallel to the first feeding direction indicated by the arrow 25. Then, selected bags 12 received on the conveyor 26 are turned 180° by the turning mechanism 28.

The conveyor 26 then delivers each bag 12 to the high speed inclined conveyor 29 which throws each bag 12 onto the upstream end 35 of the conveyor 32 in the second feeding zone 30 with each bag 12 initially positioned on the conveyor 32 with its longitudinal axis extending transversely of the second feeding direction indicated by the arrow 31. Then, selected bags 12 are quickly turned 90° by the 90° turning mechanism 34. After passing, or being turned by, the 90° turning mechanism 34, the bags 12 are carried by the conveyor 32 to the marshalling station 38 with each bag 12 having a predetermined orientation.

As a result of being turned once, twice or not at all, each bag 12 will have one of four predetermined orientations which is at least 90° different from the other orientations. In this respect, the four orientations are analogous to the X, Y, −X and −Y axes in a cartesian coordinate system. Each bag 12 is given one of these predetermined orientations in order to form one of two layer patterns A or B (FIGS. 10 and 13) on the shuttle plate 44. In this respect, layers with alternate patterns A, B, A, B, etc. are sequentially formed on the shuttle plate 44 and then sequentially deposited on the pallet 47 in the pallet elevator 46.

Referring to FIG. 10, the first layer pattern A is formed with four bags 12 a–d arranged side by side with the butt ends 14 thereof facing along one side of the layer 51, so that the sewn ends 16 12 *inwardly of the layer, and with two bags 12e* and 12 *f* arranged end to end with the sewn ends 16 abutting each other (that is to say, with the sewn ends 16 facing inwardly of the layer). The layer pattern B is formed in a similar manner, but in opposite hand relation to the layer pattern A, with two bags 12 *g* and 12 *h* arranged end to end and four bags 12 *i–l* arranged side by side as shown in FIG. 13.

Each of the mechanisms 28 and 34 is an electrically controlled-pneumatically powered mechanism. To obtain the proper orientation of each bag 12 as it is fed through the first and second feeding zones 24 and 30, each zone is provided with an individual control circuit including at least one bag sensing device for controlling the operation of the respective turning mechanisms 28 and 34 independently of each other. In this respect, a bag sensing device 60 (FIGS. 1, 2 and 17) is associated with the 180° turning mechanism and bag sensing devices 60' (shown schematically in FIG. 18) and 61 (FIGS. 5 and 18) are associated with the 90° turning device 34. In the illustrated embodiment, the sensing devices 60, 60' and 61 are limit switches. As will be described in greater detail in connection with the description of the schematic diagram in FIG. 17 (18), the control circuit for the turning mechanism 28 (34) includes a 12 position stepping switch or cam 60 *b* (61 *c*), a cam advancing mechanism 60 *f* (61 *b*), as well as the bag sensing device 60 (devices 60' and 61).

At the start of the operation of the system 2, the cam 60 *b* for the first feeding zone 24 is in a first position to complete an electrical circuit which will cause operation of the 180° turning mechanism 28, to turn the first bag 12 *a* 180° as it is being conveyed on the conveyor 26. Afterwards, the sensing devices 60 and 60' sense the turned bag 12 *a*, the sensing device 60 causing advancement of the cam 60 *b* to its second position and the sensing device 60' causing advancement of the cam 61 *c* in the control circuit for the second feeding zone 30. In the second feeding zone 30, the bags 12 will contact the sensing device 61. As will be more fully explained in connection with the description of FIG. 18, the 90° turning mechanism 34 is operated for the fifth, sixth, seventh and eighth bags 12 *e–h*. Such operation of the 90° turning mechanism 34 is initiated upon the sensing of one of these bags 12 *e–h* by the sensing device 60' and is completed upon the sensing of that bag by the sensing device 61, to cause turning of that bag 90°.

Using the analogy of the cartesian coordinate system, and with the longitudinal axis of an unturned bag constituting the +X axis, the bag 12 *a* given an orientation which places its longitudinal axis on the −X axis and the bag 12 *e* is given an orientation which places its longitudinal axis on the −Y axis. It will be understood, that in the like manner, the other bags 12 *b–d* and 12 *f–l* are each given a predetermined orientation. The turning operation for each bag 12 for each position of each cam 60*b* and 61*c* as well as the orientation given each bag are set forth in Table I below.

TABLE I

| Bag | Cam Position | 180° Turning Mechanism | 90° Turning mechanism | Orientation | Group | Layer Pattern |
|---|---|---|---|---|---|---|
| 12a | 1st | Operated | | −X | 1 | A |
| 12b | 2nd | Operated | | −X | 1 | A |
| 12c | 3rd | Operated | | −X | 1 | A |
| 12d | 4th | Operated | | −X | 2 | A |
| 12e | 5th | Operated | Operated | −Y | 2 | A |
| 12f | 6th | | Operated | +Y | 2 | A |
| 12g | 7th | Operated | Operated | −Y | 3 | B |
| 12h | 8th | | Operated | +Y | 3 | B |
| 12i | 9th | | | +X | 4 | B |
| 12j | 10th | | | +X | 4 | B |
| 12k | 11th | | | +X | 4 | B |
| 12l | 12th | | | +X | 4 | B |

After each bag 12 is given a predetermined orientation it is carried downstream to the marshalling station 38 which sequentially gathers four predetermined groups of bags 12 which each group having a predetermined array. As indicated in Table I, the first group comprises four bags 12 a–d which are gathered in the marshalling station 38 arranged side by side with the butt ends 14 thereof facing toward the shuttle plate 44. After this first group of bags 12 a–d is moved onto the shuttle plate 44 by the pusher device 40, a second group comprising two bags 12 e and 12 f are gathered in the marshalling station 38 arranged end to end with the sewn ends 16 thereof abutting each other. Then, this second group is moved by the pusher device 40 onto the shuttle plate 44 to form a layer of bags 12 having the pattern A shown in FIG. 10.

The next layer, having a pattern B, will then be formed with a third group of two bags 12 g and 12 h arranged end to end with the sewn ends abutting each other in the same manner as the second group, and a fourth group of four bags 12 i–l arranged side by side, but in opposite hand relation to the first group.

While the first six bags 12 a–f are being orientated, grouped and then formed into a layer having a predetermined pattern, the pallet 47 is being moved by the conveyor 50 from beneath the pallet dispenser 49 of the pallet elevator 46 and then raised in the pallet elevator 46 to a predetermined height just below the height of the shuttle plate 44. After the pallet 47 has reached the predetermined height and a layer has been formed on the shuttle plate 44, the shuttle plate 44 is moved from its first position, in a direction parallel to the second feeding direction indicated by the arrow 31, into the pallet elevator 46 to its second position over the pallet 47 in the pallet elevator 46. A pivoted gate 62, positioned between the pallet elevator 46 and the layer forming and shuttling station 42, is then swung down from a horizontal position to a vertical position where the lower edge of the gate 62 extends in a horizontal plane slightly above the shuttle plate 44. The shuttle plate 44 is then retracted to its first position in the layer forming and shuttling station 42. When this is done, the gate 62 engages one side of the layer 51 on the shuttle plate 44 and sweeps or wipes the layer 51 off of the shuttle plate 44 to deposit the layer 51 on the pallet 47 in the pallet elevator 46. The pallet 47 with one layer 51 thereon is then lowered a predetermined distance in the pallet elevator 46 to a position for receiving the next layer assembled on the shuttle plate 44.

After the pallet 47 in the pallet elevator 46 has been loaded with a predetermined number of layers, eight layers in the illustrated embodiment, the pallet 47 will have been lowered onto the conveyor 50 and the conveyor 50 is actuated to move the loaded pallet either onto the conveyor 52 at the pallet pick up station 54, or onto the conveyor mechanism 58 of the shrink wrap mechanism 8 for shrink wrapping a plastic material around the loaded pallet, after which the wrapped loaded pallet is moved to the pick up station 59.

At the same time the loaded pallet is moved to the pick up station 54 or 59, an empty pallet 63 (FIG. 16) which had been resting on the conveyor 50 beneath the stack 64 (FIG. 16) of pallets at the pallet supply station 48 is moved to the pallet elevator 46 and then raised therein to the predetermined height below the height of the shuttle plate 44.

The manner in which the above described operations are effected will be more fully explained in connection with the description of FIGS. 19A and B.

Referring now to FIGS. 2 and 3, it will be noted that the conveyor 26 is supported on a framework 65 (FIG. 2) which also supports two deflecting baffles 66 and 67 (FIG. 3). The baffles 66 and 67 align each bag 12 on the center line of the conveyor 26 as the bag 12 is kicked from the conveyor 10 onto the conveyor 26. They also guide each bag 12 into the 180° turning mechanism 28. The guiding of a bag 12, as it is kicked onto the conveyor 26, is generally indicated by phantom lines at 12 x in FIG. 2.

As best shown in FIG. 3, the 180° turning mechanism 28 includes an inverted U-shaped frame member 68 having a bight portion 69, which extends across and straddles the conveyor 26, and two legs 70 and 71 which are secured to the framework 65. A journal box 72 (FIG. 2) is mounted to the bight portion 69 midway between the legs 70, 71 and rotatably supports a shaft hidden from view. The lower end of this shaft is connected to a guideway, generally indicated at 73, which includes an inverted U-shaped frame member 74 having depending legs 75 and 76 and guide panels 77 and 78 secured respectively to the depending legs 75 and 76 on opposite sides of the longitudinal center line of the conveyor 26. It will be understood that the axis 79 of the shaft (not shown) is generally perpendicular to the longitudinal center line of the conveyor 26 which may be inclined slightly, as shown in FIG. 2, or may be level with an intermediate drive, such as a roller, interposed between the conveyors 26 and 29. Preferably, a cross bar 80, 81 is rigidly fixed to the lower end of each leg 75, 76 to provide lateral support for each guide panel 77, 78.

A sprocket 82 is secured to the upper end of the shaft and is driven by a chain 83 which, in turn, is driven by a pair of opposite, double acting piston and cylinder drive mechanisms 86 and 87. The drive mechanisms 86 and 87 are supported by a framework 89 secured to and extending from the bight portion 69 of the frame member 68 in cantilever fashion. Preferably, to provide a more rigid structure, the baffles 66, 67 are secured to the bight portion 69 of the frame member 68 by brackets 90 (FIG. 3).

Each drive mechanism 86, 87 is pneumatically operated and electrically controlled and includes a piston rod 91, 92. The outer end of each rod 91, 92 is secured to one end of the chain 83 as best shown in FIG. 3. It will be understood that when the drive mechanisms 86, 87 are actuated, the piston rods 91 and 92 will be moved in opposite directions to move the chain 83 in one direction with "push-pull" forces applied thereto, to turn the sprocket 82 and thereby turn the guideway 73 about the axis 79 of the shaft (not shown) to turn a bag 12, received between the panels 77, 78 of the guideway 73, 180°.

To stop forward movement of a bag 12 as it travels on the conveyor 26 in the first feeding direction indicated by the arrow 25, the 180° turning mechanism 28 includes a movable stop 94 which is movable to and from a position over the conveyor 26 in the path of movement of the bags 12. As shown, the stop 94 includes a pair of plates 95 and 96 pivotally connected to each other and biased apart by a helical torsion spring as indicated at 97. The plate 96 is fixed to a depending mounting bracket 98 which is mounted for pivotal movement about a pivot axis 99. Fixed to the lower end of the plate 96 is a limit switch 100 which is closed when the leading end of a bag 12 traveling on the conveyor 26 engages the plate 95 of the stop 94 and pushes the plate 95 against the plate 96. As shown in FIG. 2, two piston and cylinder drive mechanisms 101 and 102 are connected to the framework 89 and to the bracket 98 for pivoting the stop 94 about the pivot axis 99. The bag sensing device 60 is also mounted to the framework 89 and depends therefrom into the path of the bags 12 on the conveyor 26.

Depending upon the position of the cam 60 f the stop 94 is in or out of position for stopping movement of a bag 12 traveling on the conveyor 26. When the stop 94 is in position to stop a bag 12, engagement of the stop 94 by a bag 12 will cause closing of the limit switch 100 to cause operation of the drive mechanisms 86 and 87 to rotate the guideway 73 about the vertical axis 79 to turn the bag 180°. A bag being turned 180° is indicated by phantom lines at 12 y in FIG. 3. After the selected bag 12 is rotated 180°, the drive mechanisms 101 and 102 are operated to return the stop 94 to its raised position out of the path of travel of the bags 12 on the conveyor 26. From FIGS. 2 and 3, it is apparent that one selected bag 12 will be rotated in a counter-clockwise direction 180° and then the next selected bag will be rotated in a clockwise direction 180°. In other words, the chain 83 is reciprocated upon each two turnings of selected bags 12 and the drive mechanisms 86 and 87 provide a simple, compact and efficient means for reciprocating the chain 83 to turn selected bags 12 180°.

Referring now to FIG. 17, it will be understood that the electrical control circuit for operating the 180° turning device 28 is supplied from a conventional 110 volt a.c. source through a main disconnect switch indicated at S via lines $L_1$ and $L_2$. As shown, line $L_2$ is grounded and line $L_1$ is connected to one lead 60 a leading to a 12 position stepping switch or stepping cam 60 b and to one side of the limit switch 60. When the stepping cam 60 b is in position 1 as shown, a closed circuit is established across the cam 60 b between the lead 60 a and a lead 60 c which is connected to contacts 1–5 and 7 on the stepping cam 60 b. The lead 60 c is also connected to one side of the limit switch 100 and to one side of a solenoid 60 d. The outer side of the solenoid 60 d is connected to a normally closed switch $S_1$ so that when the stepping cam is in the first position, the solenoid 60 d is normally energized to move an armature associated with a valve $V_1$ to a position for actuating the drive mechanisms 101 and 102 to lower the stop 94 for engaging the first bag 12 a traveling on the conveyor 26.

Then, when the bag 12 a moves the plate 95 against the plate 96, the limit switch 100 is closed. When this occurs a circuit is completed through a first timer $T_1$ and through a normally closed switch $S_2$ and a second timer $T_2$. Upon being energized, the timer $T_2$ will open the switch $S_1$ to de-energize solenoid 60 d to cause stop 94 to be raised. Energization of the timer $T_1$ will cause it to "time" for a fraction of a second, after which the timer $T_1$ will cause opening of the switch $S_2$ to de-energize timer $T_2$. The timer $T_2$ is of the vacuum type which "times" for a period of a few seconds after being de-energized, typically 3–4 seconds (a sufficient time for the bag 12 a to be turned 180° and then carried by the conveyor 26 past the limit switch 60), after which the timer $T_2$ causes closing of the switch $S_1$.

Each time a bag 12 engages and closes the limit switch 60, a solenoid 60 e is energized to actuate an advancing armature 60 f for moving the stepping switch 60 b one position. Thus, engagement of the limit switch 60 by the bag 12 a will cause the cam 60 b to be moved to the second position and a circuit will again be completed between lead 60 a and lead 60 c so that after three to four seconds elapse (during which time the bag 12 a is turned 180° and passed through the turning device 28 and the stepping cam 60 b is advanced to the second position). the switch $S_1$ will be closed again to energize the solenoid 60 d to lower the gate into position to engage the next bag 12 b traveling on the conveyor 26.

The closing of the limit switch 100 will also energize one side of a limit switch LS, which will be in one of two positions. In the first position it is connected to relay coil OC which, when energized will open relay contacts 60 g. In the second position it is connected to a relay coil CC which, when energized, will close relay contacts 60 g. The contacts 60 g are connected between line $L_1$ and a solenoid 60 h which operates an armature associated with a valve $V_2$ for controlling the flow of compressed air to the piston and cylinder drive mechanisms 86 and 87. The limit switch LS is moved to one or the other of its first and second positions by a cam 60 i which is mounted on the 180° turning mechanism 28.

As shown in FIG. 17, the limit switch LS had been moved from position 2 to position 1 during the last operation of the 180° turning mechanism 28, so that, when bag 12 a engages and closes limit switch 100, relay coil OC is energized to open contacts 60 g to de-energize solenoid 60 h. This will actuate the valve $V_2$ to operate the piston and cylinder drive mechanisms 86 and 87 to retract piston rod 91 and extend piston rod 92 to turn guideway 73, with bag 12 a therein, 180°.

It will be appreciated, of course, that when the bag 12 a is turned, the limit switch 100 is open so that neither the coil OC nor the coil CC will be energized as the cam 60 i on the 180° turning mechanism engages and moves the limit switch LS from position 1 to position 2, and, when the limit switch 100 is closed again, the relay coil CC is energized to cause the piston rod 92 to be retracted and the piston rod 91 to be extended to cause the guideway 73 to be turned 180° in the opposite direction to turn the next bag 12 b 180°.

When the cam 60 b is moved to position 6 or 9, no circuit will be completed through cam 60 b between lead 60 a and 60 c so that, when the timer $T_2$ times out and switches $S_1$ is closed, the solenoid 60 d will not be energized to lower stop 94.

As shown in FIGS. 1 and 4, the first feeding zone 24 also includes the high speed inclined conveyor 29 which receives bags 12 from the conveyor 26 and literally throws the bags 12 onto the upstream end 35 of the conveyor 32 in the second feeding zone 30. In one embodiment of the invention a marker 105 is positioned above the high speed inclined conveyor 29 for marking each bag 12 with a desired marking or number. Of course, the marker 105 may be eliminated or placed elsewhere along the path of travel of the bags 12. If desired, the limit switch 60' (FIG. 18) can be mounted over the conveyor 29.

As shown in FIGS. 4 and 5, the conveyor 32 includes a plurality of rollers 107 which are supported by a framework 108 and are driven by a continuous belt 109. After each bag 12 (such as the bag 12 a) is thrown onto the upstream end 35 of the conveyor 32, the longitudinal axis of the bag 12 will initially extend transversely of the conveyor 32 and the bag 12 will contact the bag sensing device 61 which extends upwardly between two of the rollers 107.

The 90° turning mechanism 34 includes a deflector member 112 which is positioned for movement from the one side 41 of the conveyor 32 into the path of movement of one portion of each of the bags 12 received on the conveyor 32. As shown, a piston and cylinder mechanism 114 is connected to the deflector member 112 for moving the same. The turning mechanism 34 also includes a movable guide member 116 which, when not operated, is positioned at the upstream end 35 of the conveyor 32 near the other side 43 of the conveyor 32 and out of the path of the bags 12, as shown in FIGS. 4 and 5. The guide member 116 is in the form of a cylinder or roller and, as best shown in FIG. 4, is secured to a vertical mounting bar 118 which is suspended from a bracket 119 mounted for horizontal sliding movement on a guide bar 120. The guide bar 120 is supported above the conveyor 32 by a framework 121 mounted to the framework 108. A cylinder 122 (fully shown in FIG. 1) is mounted to the framework 121 above the guide rod 120 and a double acting piston (not shown) is positioned within the cylinder 122. A tape 123 is connected to the piston and the ends of the tape 123 are secured to the bracket 119 as indicated at 124, 125 in FIGS. 5 and 6. It will be understood that when fluid is admitted to one end of the cylinder 122, the piston is actuated to move the tape 123 to move the guide member 116 either in a forward direction parallel to the second feeding direction indicated by the arrow 31, or in a reverse direction 180° to the second bag feeding direction. Preferably, a guide bar 126 (FIGS. 1 and 4) is mounted to the framework 121 at the upstream end 35 adjacent the side 43 of the conveyor 32, and is positioned to engage and laterally support and guide the vertical mounting bar 118 when the guide member 116 is moved.

In FIG. 5, the guide roller 116 and the deflector member 112 are in their retracted positions and the bag 12 a is shown being fed downstream on the conveyor 32 in the second bag feeding direction indicated by the arrow 31 without having been turned by the 90° turning mechanism 34.

After a predetermined number of bags have contacted the bag sensing device 60', the cam 61 c for the second feeding zone 30 is advanced to a position where a circuit is closed to actuate the piston and cylinder mechanism 114 to cause the deflector member 112 to be projected from the one side 41 of the conveyor 32 into the path of a selected bag 12 (such as the bag 12 e) received on the conveyor 32 as shown in FIG. 6. When the bag 12 e engages the sensing device 61, a circuit is closed to actuate the cylinder 122 for moving the guide roller 116 in the forward direction indicated by the arrow 31.

As shown, the bag 12 e has already been turned 180° by the bag 180° turning mechanism 28 such that the leading end of the bag 12 e (hereinafter referred to as the first end 127a) as it is thrown onto the conveyor 32 is the butt end 14 of the bag 12 e and the trailing end (hereinafter referred to as the second end 127 b) is the sewn end 16 of the bag 12 e. The first or leading side of the bag 12 e as it starts to move on the conveyor 32 is indicated at 127 c and the second or trailing side is indicated at 127 d. The turning of the bag 12 e will now be described with reference to FIG. 6 and FIGS. 7A–7C.

As shown in FIG. 6, when operation of the 90° turning mechanism 34 is initiated upon sensing of the bag 12 e by the sensing device 60', the deflector member 112 is moved over the conveyor 32 in position to engage the first side 127 c of the bag 12 e near the second end 127 b of the bag 12 e, and then, when the bag 12 e engages the bag sensing device 61, the reciprocal guide member 116 is moved into engagement with the second side 127 d of the bag 12 e near the first end 127 a. Thereafter, as shown in FIG. 7A, the guide member 116 is moved in a forward direction along the second side 127 d of the bag 12 e and toward the first end 127 a of the bag 12 e with the deflector member 112 maintained in its blocking position. In this way, and as shown in FIGS. 7A and 7B, the guide member 116 cooperates with the deflector member 112 in turning the bag 12 e 90° as the guide member 116 is moved forward. Moreover, the deflector member 112 has a curved or rounded deflecting surface to facilitate the turning of the bag 12 e about the deflector member 112.

When the guide member 116 moves in the forward direction, to quickly turn the bag 12 e about the deflector member 112, it can impart sufficient momentum to the bag 12 e to turn the bag 12 e more than 90° such that the longitudinal axis 128 of the bag 12 e is inclined at a slight angle to the feeding direction indicated by the arrow 31, as best shown in FIG. 7B. To correct this slight misalignment, that is to say, to align the bag 12e with its longitudinal axis 128 parallel to the feeding direction indicated by the arrow 31, the guide member 116 is moved in the second or reverse direction, after the bag 12 e passes over or "clears" the sensing device 61, to again engage the second side 127 d of the bag 12 e, and then is moved along the second side 127 d toward the second end 127 b while the deflector member 112 is maintained stationary as shown in FIG. 7C. In this way, the guide member 116 and the deflector member 112 cooperate in aligning the bag 12 e with its longitudinal axis 128 parallel to the feeding direction indicated by the arrow 31, as the guide member 116 is moved in the reverse direction to its starting position. It will be understood, that while the guide member 116 is moving back and forth, the rollers 107 are urging the bag 12 being turned in the second feeding direction indicated by the arrow 31. After a bag 12 is turned 90°, it is carried downstream through the bag holding area 36.

The electrical control circuit for the 90° turning mechanism 34 is shown in FIG. 18 and includes a limit switch 60' which can be positioned next to the limit switch 60 (as indicated schematically in FIGS. 17 and 18) or over the high speed inclined conveyor 29. Closing of the limit switch 60' will cause energization of a solenoid 61 *a* which is connected in series with limit switch 60' between lines $L_1$ and $L_2$ for moving an armature 61 *b* to advance a 12 position stepping switch or cam 61 *c* one position. When the fifth bag 12 *e* engages and closes the limit switches 60 and 60', the armature 61 *b* is moved to advance the stepping cam 61 *c* to its 5th position. A circuit will then be closed between a lead 61 *d* connected to line $L_1$ and a lead 61 *e* connected to the fifth through eighth contacts on the stepping cam 61 *c*. When this circuit is completed across cam 61 *c* between lead 61 *d* and 61 *e*, a solenoid 61 *f* is energized to operate a valve $V_3$ to cause the drive mechanism 114 to move the deflector member 112 over the live bottom roller conveyor 32. Then, when the fifth bag 12 *e* is thrown onto the conveyor 32 and engages and closes the limit switch 61, another solenoid 61 *g* is energized to operate a fourth valve $V_4$ which controls the flow of compressed air to the cylinder 122. In this respect, when the limit switch 61 is closed and the solenoid 61 *g* is energized, the valve $V_4$ is operated to apply compressed air to the cylinder 122 to cause the guide member 116 to be moved in a forward direction. Then, after the bag 12 *e* is turned and the trailing end of the bag 12 *e* has passed over the limit switch 61 releasing the same, the solenoid 61 *g* is de-energized and the valve $V_4$ is operated to apply compressed air to the cylinder 122 to cause the guide member 116 to be moved in the reverse direction, to retract the same to its at-rest position at the upstream end 35 of the conveyor 32, and in so doing, cooperate with the deflector member 112 in aligning the bag 12 *e* with its longitudinal axis 128 extending parallel to the second feeding direction 31. Upon each succeeding advancement of the stepping cam 61 *c* to the sixth, seventh and eighth positions, respectively, a circuit will again be established between leads 61 *d* and 61 *e* for causing the deflector member 112 to be extended and for enabling the limit switch to cause operation of the guide member 116 when the limit switch 61 is closed by each of the bags 12 *f*, 12 *g* and 12 *h* for turning each of these bags 90° in the manner described above.

The construction and general operation of the remaining mechanisms of the palletizer 6 will now be described, followed by the description of the manner in which these mechanisms are operated, in conjunction with the description of the control circuits therefor shown in FIGS. 19A and 19B.

Since the filling of the bags 12 by the bag filling and closing mechanism 4 is continuous, the bags 12 are fed continuously through the first feeding zone 24 to the second feeding zone 30 and then toward the marshalling station 38 at the downstream end 39 of the conveyor 32 in the second feeding zone 30. However, the pushing of each group of bags 12 from the marshalling station 38 onto the shuttle plate 44 and the shuttling of a layer of bags 12 from the layer forming and shuttling station 42 onto a pallet 47 in the pallet elevator 46 is intermittent, and will be delayed when a loaded pallet is moved from the pallet elevator 46 and the unloaded pallet 63 is moved into the pallet elevator 46 and raised to the predetermined position just below the height of the shuttle plate 44. When this delay occurs, it is desirable to prevent bunching up of the bags 12 at the marshalling station 38. For this purpose the second feeding zone 30 includes the holding area 36.

The holding area 36 includes several stop means, the first stop means being the gate 37, which is lowered after a group of bags 12 has been gathered in the marshalling station 38, to stop the next bag 12 (such as the bag 12 *i*) traveling along the conveyor 32, as shown in FIG. 8. When this occurs, the bag 12 *i* will close a switch, indicated by phantom lines at 130, which extends upwardly between two of the rollers 107. The closing of the switch 130 energizes a solenoid (indicated schematically at 288 in FIG. 19A) for projecting two buttons 131 and 132 upwardly between another two of the rollers 107 on opposite sides of the belt 109 and into the path of the bags 12 on the conveyor 32 to form a second stop means for stopping the next bag 12 *j* as shown.

In like manner, when the loaded pallet 47 is being removed from, and an empty pallet 63 is being moved into, the pallet elevator 46, and forward movement of the pusher device 40 to cause opening of the gate 37 is prevented, the bag 12 *j* will close a switch, indicated by phantom lines at 133, which energizes a solenoid (indicated schematically at 289 in FIG. 19A) to project buttons 134, 135 upwardly between another two of the rollers 107 to form a third stop means for stopping the next bag 12 *k*. Again, in like manner, the bag 12*k* will close a switch, indicated by phantom lines at 136, which controls the operation of a gate 137 to cause the gate 137 to be lowered to stop movement of the next bag 12 *l*.

In this way, bunching up of the bags 12 *i–l* while pallets are being changed is prevented and the bags 12 *i–k* are held at spaced apart locations in the holding area 36. It should be noted that a bag sensing device, which is indicated by phantom lines at 138 and which is shown as a limit switch in FIG. 19A, senses each bag 12 as it travels into the marshalling station 38 and, after a predetermined group of two or four bags 12 have been sensed, a circuit is energized to cause closing of the gate 37. If the bags were allowed to bunch up at the gate 37, the bag sensing device 138 might not be released until all the bags 12 have traveled past the sensing device 138 and the sensing device 138 would, in essence, sense only one bag. For this reason also, the buttons 131, 132 and 134, 135, hold the bags 12 *i–k* spaced apart in the holding area 36. Then, when the gate 37 is opened (raised), causing the buttons 131, 132, 134 and 135 to retract below the rollers 107 and the gate 137 to rise, each bag 12 *i–l* with be sequentially and individually sensed by the sensing device 138.

In the operation of the palletizer 6 of the present invention with one known type of bag filling and closing mechanism 4, the time in which the bags 12 are filled, closed and then kicked onto the conveyor 26 in the first feeding zone 24 relative to the speed of operation of the various mechanisms of the palletizer 6, particularly the speed of the pallet elevator 46 and the pallet conveyor 50, in such that, after the exchange of pallets, pusher device 40 is allowed to move forward to energize a circuit to cause opening (raising) of the gate 37 and retraction of the buttons 131, 132, 134 and 135 just as the switch 136 is closed and the gate 137 starts to descend. The gate 137 stops its descent and returns to its raised position.

The formation of a layer having an "A" pattern is shown in FIG. 9. In this respect, a group of four bags 12 a–d, having a group 1 arrangement (see Table I) are already disposed in side-by-side relation on the shuttle plate 44 and the pusher device 40 is moving another group of two bags 12 e and 12 f having a group 2 arrangement onto the shuttle plate 44 to form the layer with the "A" pattern. It is to be noted that the sewn ends 16 of all the bags 12 a–d face inwardly of the layer being formed. Also, it is to be noted that the shuttle plate 44 is spaced from the side 43 of the conveyor 32 to facilitate movement of the shuttle plate 44 in and out of the pallet elevator 46, and this space is bridged by an apron 139.

Closing of the gate 37 normally initiates forward movement of the pusher device 40. The extend of forward movement of the pusher device 40 is controlled by one of three limit switches 141–143, one of which terminates movement for a particular group of bags when it is engaged by a cam 144 on the pusher device 40. In this respect, closing of the limit switch 141 when the pusher device 40 is pushing a group of two bags 12 g, 12 h having a group 3 arrangement onto the shuttle plate 44 will cause termination of forward movement of the pusher device 40. Closing of the limit switch 142 terminates movement of the pusher device 40 when it is pushing a group of four bags having a group 1 arrangement onto the shuttle plate and closing of the limit switch 143 terminates movement of the pusher device 40 when it is moving a group of two bags 12 e, 12 f having a group 2 arrangement or a group of four bags 12 i–l having a group 4 arrangement. Moreover, after forward movement is terminated by one of these limit switches 141–143 reverse movement of the pusher device 40 is initiated.

Opening of the gate 37 is controlled by a limit switch 145 which, after it is engaged by the cam 144, causes opening of the gate 37 to permit the succeeding bags 12 on the conveyor 32 to be received in the marshalling station 38.

As shown in FIG. 9, the pusher device 40 includes a carriage 147 which rotatably supports a rectangular bag engaging plate 148. Rotation of the plate 148 from a vertical bag engaging position to a horizontal non-bag engaging position where it will pass over any bags lying beneath it in the marshalling station 38, is brought about, at the same time reverse movement of the pusher device 40 is initiated by actuation of piston and cylinder mechanisms 151 and 152 mounted on the carriage 147 and connected to the plate 148. In this way, gathering of the next group of bags 12, in a predetermined array in the marshalling station 38 is allowed to proceed with minimum loss of time after one group of bags 12 has been pushed onto the shuttle plate 44 and the pusher device is returning to its at-rest or "home" position, adjacent the one side 41 of the conveyor 32. When the pusher device 40 reaches its "home" position, the cam 144 engages and closes a limit switch 153. Closing of the limit switch 153 causes termination of the reverse movement of the pusher device 40 and operation of the mechanisms 151, 152 to return the plate 148 to its vertical bag engaging position. The carriage 147 is supported for horizontal reciprocal movement on a track generally indicated at 154, 155 and is driven by chains 156, 157. The chains 156, 157 are driven by an electric motor 158 shown in FIG. 1.

A limit switch 159 controls movement of a bumper plate 160 into engagement with a group 2 or group 4 arrangement of bags 12, as they are moved onto the shuttle plate 44, to ensure proper positioning of the bags 12 on the shuttle plate 44. The bumper plate 160 is mounted adjacent the side of the layer forming and shuttling station 42 opposite the pallet elevator 46 and is operated by a conventional air cylinder actuated by a solenoid (indicated schematically at 310 in FIG. 19A). The bumper plate 160 is moved to a position shown in phantom lines at 160 a a short time after the cam 144 on the device 40 engages the limit switch 159 whole moving a group 2 or group 4 arrangement of bags 12 onto the shuttle plate 44 to complete a layer of the bags 12.

A completed layer 51 having an "A" pattern is shown in FIG. 10 and it will be noted that, with the size of the bags illustrated, the lateral extend to the four bags 12 a–d arranged side-by-side is greater than the longitudinal extent of the two bags 12 e and 12 f abutting each other end to end. As will be described in connection with the description of FIGS. 11–13, the palletizer 6 of the present invention includes two spreading devices 161 and 162 (FIGS. 1 and 12) for spreading apart the two bags 12 e, 12 f or 12 g, 12 h abutting each other end to end as they are deposited over the pallet 47 in the pallet elevator 46 so that the butt ends 14 of the two bags 12 e, 12 f, or 12 g, 12 h positioned end to end will be in line with the outer sides of the outer two bags 12 a, 12 d or 12 i, 12 l of the bags 12 disposed side by side. A layer having a "B" pattern, with the bags 12 g and 12 h spread apart, is shown in FIG. 13.

Referring now to FIG. 12, it will be understood that after the pusher device 40 has been moved across the marshalling station 38 twice to arrange two groups of bags into a layer on the shuttle plate 44, having a pattern "A" or a pattern "B", a circuit is energized to cause the shuttle plate 44 to be moved from its first position in the layer forming and shuttling station 42 to its second position over the pallet 47 in the pallet elevator 46. When the shuttle plate 44 is in the second position a circuit is closed to cause the gate 62 to be swung downwardly. Then, the shuttle plate 44 is retracted to its first position with the gate 62 sweeping or wiping the layer off of the shuttle 44 to deposit this layer over the pallet 47. At the same time one of the spreading devices 161 or 162 is operated, depending on the pattern (A or B) of the layer being deposited, to separate the two bags 12 e, 12 f, or 12 g, 12 h abutting each other end to end as the layer is wiped off of the shuttle plate 44.

It will be noted that the pallet 47 is preferably loaded first with a pattern "A" layer and then with a pattern "B" layer. This choice of layers is preferred since it allows for the holding of bags 12 in the holding area 36 which have their longitudinal axes extending transversely of the conveyor 32. This result is obtained by reason of the fact that after a pallet 47 is loaded with eight layers of bags 12 and the loaded pallet 47 is moved from the pallet elevator 46 while the next empty pallet 63 is moved into the pallet elevator 46 and raised to the predetermined height just below the shuttle plate 44, a first layer of bags 12 *a–f* having a pattern "A" arrangement is formed on the shuttle plate 44, a third group of two bags 12 *g*, 12 *h* having a group 3 arrangement is received in the marshalling station 38, and three bags 12 *i*, 12 *j* and 12 *k* are collected in the holding area 36. The timing of the movement of the empty pallet 63 into the pallet elevator 46, the raising of the empty pallet 63 to the predetermined height below the height of the shuttle plate 44, the shuttling of the shuttle plate 44 to deposit the pattern "A" layer onto the empty pallet 63 and then the movement of the pusher device 40 across the marshalling station 38 to move the third group of bags 12 *g*, 12 *h* onto the returned shuttle plate 44, is such that the switch 136 will be energized to start downward movement of the gate 137 just before the cam 144 on the pusher device 40 engages the limit switch 145 to open the gate 37 and cause reverse movement of the gate 137. With this timing, operation of the palletizer 6 is continuous.

As shown in FIGS. 11 and 12, after a layer of bags 12 on the shuttle plate 44 is positioned over the pallet 47 in the pallet elevator 46, one of the spreading devices 161 or 162 is lowered into contact with the abutting ends of the two bags 12 *e*, 12 *f* or 12 *g*, 12 *h* disposed end to end on the shuttle plate 44 for separating the abutting ends thereof while the layer is wiped off of the shuttle plate 44 and deposited over the pallet 47 ad the shuttle plate 44 is retracted. Each separating device 161, 162 includes a vertically movable member, such as a piston rod 171, which has an upper end received in a conventional air cylinder 172 which is actuated by a solenoid (indicated schematically at 331 and 332 in FIG. 19B). First and second spring arms 173 and 174 are secured to the lower end of the rod 171 and extend vertically downwardly and laterally outwardly from the rod 171. A cushion member 175, 176 is fixed to the lower end of each spring arm 173, 174. As shown in FIG. 11, the cushion members 175, 176 of the spreading device 162 are arranged for movement into engagement with the abutting ends of the abutting bags 12 *g*, 12 *h* when the shuttle plate 44 is positioned over the pallet 47 with a pattern "B" layer thereon. After engagement of the cushion members 175, 176 with the abutting ends of the bags 12 *g*, 12 *h*, continued downward movement of the rod 171 causes the spring arm 173, 174 to deflect laterally, outwardly, as indicated by phantom lines at 177, 178, and in such a way that when the shuttle plate 44 is retracted, the abutting bags 12 *g*, 12 *h*, are spread apart by the spring arms 173, 174. In this respect, it is to be noted that the sliding frictional contact between the shuttle plate 44 and the lower side of the bag 12 *h*, as the shuttle plate 44 is retracted, assists the spring arm 174 in separating the bag 12 *h* from the bag 12 *g* while the spring arm 175 holds the bag 12 *g* in place against the sliding friction between the shuttle plate 44 and the bag 12 *g*.

As best shown in FIG. 13, after the shuttle plate 44 has been retracted and the layer is deposited over the pallet 47 in the pallet elevator 46, the bag 12 *h*, will have been moved away from the bag 12 *g* a distance S so that the outer ends 14 of the bags 12 *g*, 12 *h* arranged end to end will be in line with the outer sides of he bags 12 *i*, 12 *l* respectively, and the corners, of the bags 12*g*, 12 *h*, 12 *i* and 12 *l* which form the corners of the layer having a "B" pattern, will be "squared". The position of the bag 12 *h* before it is separated from the bag 12 *g* is indicated by the phantom lines 183 in FIG. 13. FIG. 12 shows the separation of the bags 12 *e* and 12 *f* by the spreading device 162.

Referring back to FIG. 11, it will be understood that the pallet elevator 46 includes a framework 184 which supports the spreading devices 161 and 162 and a pallet lift mechanism 185 for raising and lowering a pallet, such as the pallet 47, in the pallet elevator 46. The pallet lift mechanism 185 includes a drive mechanism 186 supported by the framework 184 and four vertical guide posts 187 each of which supports a chain drive 188 for raising and lowering a pallet engaging lift member 189 along the guide post 187. The drive connection between the drive mechanism 186 and one of the chain drives 188 is indicated at 190 and includes a sprocket 191 mounted on a shaft 192 rotatably supported at the upper end of one of the posts 187. The shaft 192 mounts another sprocket 193 for connecting the shaft 192 via a chain 194 with a sprocket 195 of the drive mechanism 186. The sprocket 195 is supported on a shaft 196 which is driven by an electric motor 197 shown in FIG. 1.

As shown in FIG. 14, each of the lift members 189 is generally L-shaped and, as shown in FIG. 15, includes two L-shaped plates 198 and 199. The horizontally extending leg 200, 201 of each plate 198, 199 is received under the pallet 47, as shown in FIG. 14. It will be understood that, when an empty pallet is carried into the pallet elevator 46 on the conveyor 50, the legs 200, 201 of the each of the lift members 189 are located below the pallet. Then, when the electric motor 197 is energized to raise the pallet, the lift members 189 will engage the underside of the pallet and lift the pallet to the predetermined height just below the height of the shuttle plate 44.

The plates 198 and 199 of each of the lift members 189 are secured together about one of the posts 187 by bolts 203–206 which also support rollers, such as the rollers 207, 208, which bear against the post 187 to guide the left member 189 along the post 187 and to properly align the members 189 relative to each other when the lift members 189 are simultaneously raised or lowered.

Descent of the pallet 47 in the pallet elevator 46 controlled by a cam mechanism 210 and a limit switch 212 mounted on one of the lift members 187, as shown in FIG. 11. The cam mechanism 210 includes a plurality of spaced apart groups 214 of cams mounted on a rod 216. Each group 214 includes three cams 217, 218 and 219 which are elongated and which are laterally arcuately displaced from one another at least 90°, such that each set of like numbered cams are vertically aligned one above the other. The distance between each adjacent two like numbered cams, e.g., cams 217, is the same and may be different than the distance between any adjacent two of the other like numbered cams, e.g., cams 218. The number of groups 214 of cams 217–219 depends on the number of layers to be stacked on each pallet 54; and the thickness of each layer, or the thickness of the pallets used, determines which set of like numbered cams 217, 218 or 219 is positioned in the path of the limit switch 212. With three sets of like numbered cams, the cam mechanism 210 can be adjusted either for layers having one of three different heights dependent upon the thickness of the bags 12 being filled, or for pallets having one of three different heights. Thus, for the size of bag used in the illustrated embodiment and/or for one size of pallet 47, the cams 217 are positioned in the path of the limit switch 212, and each time the shuttle plate 44 is retracted and the electric motor 197 is energized to lower the pallet 47, downward movement of the pallet 47 with the layer just deposited thereon is terminated when the limit switch 212 engages one of the cams 217. Of course, the distance traveled by the pallet 47 will be essentially the height of one layer of the bags 12 so that the partially loaded pallet 47 is then ready to receive another layer of bags 12 from the shuttle plate 44.

To set the cam mechanism 210 either for a layer having a different height or for a different size of pallet, one merely rotates the rod 216 to place another set of like numbered cams 218 or 219 on the path of movement of the limit switch 212. Also, it is to be understood that each cam is adjustably mounted on the rod 216, such as with a set screw, to permit adjustment to the cams 217–219 for controlling the stacking of a different number of layers on each pallet 45, for stacking layers (of bags on other containers) having a different height than the three heights for which the cams 217–219 are initially set, and/or for stacking layers on a different size pallet.

After the eighth layer of bags 12 has been deposited over the pallet 47, the pallet 47 will be lowered onto the conveyor 50 and the conveyor 50 will be operated to move the loaded pallet 47 out of the pallet elevator 46 in the direction indicated by the arrow 222. At the same time the empty pallet 63, previously deposited on the conveyor 50, is moved from beneath the pallet dispenser 49 into the pallet elevator 46. When the pallet 63 is in proper position in the pallet elevator 46, the electric motor 197 is energized to raise the pallet 63 to the predetermined height just below the height of the shuttle plate 44. At about the same time, the pallet dispenser 49 is operated to deposit the next lowermost pallet (shown at 263 in FIG. 16) in the stack of pallets 64 at the supply station 48 onto the conveyor 50.

As shown in FIG. 11, the pallet supply station 48 includes a generally square, pallet retaining framework 224 which is open on one side and which is mounted above the pallet dispenser 49 for retaining the stack of pallets 64. It will be understood that the stack of empty pallets 64 is placed within the framework 224 through the open side thereof by a fork lift truck (not shown). Retainer plates 227 and 228 are fixed at the lower corners of the open side of the framework 224 to retain the lowermost pallets of the stock 64 and to prevent the same from being moved laterally outwardly from the framework 224.

The pallet dispenser 46 includes a rectangular framework 230 which is supported above the conveyor 50 and which, in turn, supports the framework 224 and the plates 227 and 228. A horizontally extending shaft 232 is suitably journaled, as indicated at 233–236, on each side portion 237 of the framework 230 which extends parallel to the conveyor 50. As shown, one end 238 of each shaft 232 is connected to a drive mechanism generally indicated at 239.

Each of the side portions 237 has two openings 240, 241 and a portion of one of two star wheels 242 mounted on each shaft 232 extends through each opening 240, 241. As shown in FIG. 16, each of the star wheels 242 (there being four in number) has four radial vanes or paddles 251, 252, 253, 254. The paddle 251 of the star wheel 242 extends under a portion of the lowermost pallet 263 in the stack of pallets 64. It will be understood that the other three star wheels 242 also have a portion of one of the paddles 251–254 expending under the lowermost pallet 263 in the stack of pallets 64. It will be understood that the other three star wheels 242 also have a portion of one of the paddles 251–254 extending under the lowermost pallet 263 in the stack of pallets 64. Then, when the drive mechanism 239 of the dispenser 49 is energized to deposit a pallet on the conveyor 50 the star wheels are turned 90°. As the paddle 251 is moved downwardly and laterally away from the lowermost pallet 263 to deposit the same on the conveyor 50, the next paddle 252 is moved underneath the next lowermost pallet 264 in the stack of pallets 64 and the stack of pallets falls or descends the distance equal to the height of one pallet. This movement of the star wheel 242 in indicated by phantom lines 265 in FIG. 16. In this way, the star wheels 242 provide a simple and effective means for sequentially depositing pallets onto the conveyor 50 from the stack 64 in the pallet supply station 48.

The electrical control circuits for controlling the pusher device 40, the shuttle plate 44, the pallet elevator 46, the spreading devices 161 and 162, the pallet dispenser 49, the pallet conveyors 50 and 52, the gates 37 and 137 and the stop buttons 131, 132, 134 and 135 will now be described in detail with reference to FIGS. 19A and 19B.

As shown, the electrical circuits are supplied with 110 volts AC through switch S. As in FIGS, 17 and 18 line $L_1$ is the positive conductor or bus and line $L_2$ is the common or neutral conductor.

The limit switch 138, situated at the entrance to the marshalling station 38, is connected in series with a solenoid 269 across lines $L_1$ and $L_2$. The switch 138 is normally open and, when closed by a bag 12 passing thereover, will complete a circuit between lines $L_1$ and $L_2$ through the solenoid 269 to energize same and thereby cause movement of the armature 270 for advancing a bank or gang or eight stepping switches or cams 271–278. Each cam 271–278 has 12 positions and is moved one position each time the solenoid 269 is energized and the armature 270 is projected into engagement with the bank of cams 271–278. In certain positions, electric circuits will be completed by the cams 271–278 to cause operation of various mechanisms of the palletizer 6. In this respect, the cam 272 controls the closing of the gate 37. The stepping cams 273–275 cooperate with the limit switches 141–143 in limiting the extent of forward movement of the pusher device 40. The cam 276, in conjunction with the limit switch 143, controls movement of the shuttle plate 44 into the elevator 46. Cams 271 and 278 control operation of the spreading device 161 and 162.

Referring to cam 272, it is to be understood that when this cam is in the fourth, sixth, eighth or 12th position a circuit will be established from line $L_1$ across cam 272 to a lead 280 connected to two circuits 281 and 282. Circuit 281 includes normally closed relay contacts $RC_1$ and a relay coil $CR_2$ connected in series between the lead 280 and line $L_2$. The circuit 282 includes relay coil $CR_1$ and normally open relay contacts $RC_{2a}$. Two other circuits 283 and 284 are associated with the circuits 281 and 282. The circuit 283 includes a solenoid 285 connected in series with normally open relay contacts $RC_{2b}$ between lines $L_1$ and $L_2$. The circuit 284 includes normally closed limit switch 145 and normally open relay contacts $RC_{2c}$ connected in series between line $L_1$ and the junction between relay contacts $RC_1$ and relay coil $CR_2$. As shown, the solenoid 285 controls a valve $V_g$ which actuates suitable pneumatic mechanisms for lowering and raising the gate 37.

After the first four bags 12 a–d have passed over the limit switch 138 into the marshalling station 38, the cam 272 is moved to its fourth position and a circuit is completed from line $L_1$ through cam 272, lead 280, closed contacts $RC_1$ and coil $CR_2$ to line $L_2$ to energize coil $CR_2$ and cause closing of contacts $RC_{2a-c}$. Closing of contacts $RC_{2c}$ will close a circuit through the relay coil $CR_2$, contacts $RC_{2c}$ and limit switch 145 to line $L_1$. In this way, the coil $CR_2$ will remain energized when contacts $RC_1$ are opened as a result of the energization of coil $CR_1$ brought about by the closing of contacts $RC_{2a}$. The relay operated by the coil $CR_1$ is of the time delay type such that opening of contacts $RC_1$ is delayed a fraction of a second after the coil $CR_1$ is energized to allow time for closing of the contacts $RC_{2c}$ prior to the opening of the contact $RC_1$. Closing of the contacts $RC_{2b}$ results in energization of the solenoid 285 which operates the valve $V_g$ to cause lowering of the gate 37. The gate 37 will remain in its lowered or closing position until the cam 144 of the pusher device 40 engages and opens the limit switch 145 during forward movement of the pusher device 40. When this occurs the coil $CR_2$ is de-energized opening contacts $RC_{2a-c}$ resulting in de-energization of the solenoid 285 to operate the valve $V_g$ to cause raising of the gate 37.

When the gate 37 is in its lowered position, it closes a limit switch 286, and if the pusher device 40 is prevented from moving forward such as when (a) a loaded pallet is being moved from the pallet elevator 46, (b) an unloaded pallet 63 is being moved to the pallet elevator, (c) six bags 12 a–f forming a layer "A" pattern are on the shuttle plate 44, (d) two bags 12 g and 12 h having a group 3 arrangement are in the marshalling station 38, and (e) the cam 271 is in the eighth position, a closed circuit is established from line $L_1$ through the cam 271 the limit switch 286, and a lead 287 to the limit switch 130. Then, when the next bag 12 i engages the limit switch 130, a circuit is closed between lines $L_1$ and $L_2$ through a solenoid 288 which then projects the buttons 131 and 132 upwardly in position to stop the next bag 12 j. Closing of the limit switch 130 establishes line $L_1$ voltage at one side of the limit switch 133 so that when the bag 12 j engages the limit switch 133 another circuit is closed between lines $L_1$ and $L_2$ through a solenoid 289 which then moves the stop buttons 134 and 135 upwardly in position to stop movement of the next bag 12 k. In like manner closing of the limit switch 133 establishes line $L_1$ voltage at one side of the limit switch 136 so that when the bag 12 k engages the buttons 135 and 135 and closes the limit switch 136, a solenoid 290 is energized to actuate a valve $V_5$ to operate a suitable pneumatic mechanism for causing lowering of the gate 137. As explained above the timing of the operation of the various mechanisms of the palletizer 6 is such that normally, cam 144 will engage the limit switch 145 just as the gate 137 starts to descend. Opening of the limit switch 145, de-energizes the solenoid 285 causing gate 37 to be raised and raising of the gate 37 opens the limit switch 286 to de-energize solenoids 288–290 to retract stop buttons 131, 132, 134, and 135 and raise the gate 137.

If an empty pallet, e.g., pallet 63, is not received in the pallet elevator 46 and the pusher device 40 does not move forward the next bag 12 l will be stopped by the gate 137. In one embodiment of the palletizer 6 of the present invention, the bag 12 l will engage and close a limit switch 291 positioned in front of the gate 137 as shown in FIG. 8. Closing of the limit switch 291 will energize relay coil $CR_3$ to close relay contacts $RC_3$ to energize a master control solenoid 291 for moving an armature 292a to open the switch S and de-energize all the control circuits for the palletizer 6 as well as control circuits for the bag filling and closing machine 4.

During the descent of the gate 37, it will engage, and momentarily close, a limit switch 293 which connects line $L_1$ to a lead 294 connected to the stationary contact associated with each of the cams 273–275. As shown, the gate 37 will only be lowered when the cam 272 is in the fourth, sixth, eighth, or 12th position. Accordingly, the limit switch 293 will only be closed when the cams 273–275 are in one of these positions. It will be apparent from FIGS. 19A–B that when the cams 171–278 are, (a) in the fourth position a circuit will be established through cam 274, (b) in the eighth position a circuit is established through cam 273, and (c) in the sixth or 12th positions, a circuit is established through cam 275.

When the cam 274 is in the 4th position and the gate 37 is lowered, momentarily closing the limit switch 293, a circuit is closed through the cam 274 to energize a relay coil $CR_4$ for closing contacts $RC_{4a}$ and $RC_{4b}$. The contacts $RC_{4a}$ are connected in series with the limit switch 142 between line $L_1$ and the junction between cam 274 and coil $CR_4$ and will "lock in" the coil $CR_4$. That is to say, it will maintain the coil $CR_4$ energized after the limit switch 293 is opened. The closing of the relay contacts $RC_{4b}$ will complete a circuit between line $L_1$ and a common lead 295 connected to a circuit 296 to energize the circuit 296. The circuit 296 is connected between lead 295 and line $L_2$ and includes a closed limit switch 297, normally closed contacts $RC_5$ and a coil $CR_6$. Energization of the coil $CR_6$ will actuate a motor control 298 for operating the electric motor 158 (FIG. 1) to move the pusher device 40 forward until the cam 144 engages and opens limit switch 142, to de-energize coil $CR_4$ to open contacts $RC_{4a-b}$, with the opening of contacts $RC_{4b}$ de-energizing circuit 296. The limit switch 297 is situated beneath and adjacent the side of the shuttle plate 44 beneath the bumper plate 160, and it will be understood that the limit switch 297 must be closed by the shuttle plate 44 (that is to say, the shuttle plate 44 must be at its first position within the layer forming and shuttling station 42) before the pusher device 40 can be moved.

It will be noted that three other circuits 301–303 connected in parallel between lines $L_1$ and $L_2$ are associated with the circuit 296. The circuit 301 includes limit switch 153, a coil $CR_7$ and normally closed contacts $RC_6$ all connected in series. Coil $CR_7$ controls contacts $RC_{7a}$ and $RC_{7b}$ in circuits 32 and 303. The circuit 302 includes normally open, relay contacts $RC_{7a}$ and relay coil $CR_5$ connected in series. The coil $CR_5$ controls contacts $RC_5$ in the circuit 296 and actuation of a motor control 305 for operating the electric motor 158 to move the pusher device back to its at rest or "home" position at the side 41 of the conveyor 32. The circuit 303 includes normally open relay contacts $RC_{7b}$ and a solenoid 306 connected in series. The solenoid 306 actuates a valve $V_6$ for operating drive mechanism 151 and 152 to raise the plate 148.

When the pusher device 40 is at its "home" position, the cam 144 will engage and hold open the limit switch 153. Accordingly the circuit 310 will initially be open and, with contacts $RC_{7a-b}$ initially open, circuits 302 and 303 will initially be open.

When circuit 296 is completed as described above the coil $CR_6$ is energized to operate the motor control 298 to initate forward movement of the pusher device 40. At the same time coil $CR_6$ will cause opening of normally closed contacts $RC_6$ so that, hen the cam 144 moves away from the limit switch 153 allowing it to close, the circuit 301 will still be open by reason of open contacts $RC_6$ thereby preventing energization of coil $CR_7$ and closing of contacts $RC_{7a-b}$.

When the pusher device 40 has moved the first group of four bags 12 a–d into position on the shuttle plate 44 and the cam 144 engages and opens the limit switch 142, the circuit 296 will be opened and the coil $CR_6$ will be de-energized thereby de-energizing the motor control 298 to stop forward movement of the pusher device 40. De-energization of the coil $CR_6$ will also cause closing of the contacts $RC_6$ and, with the limit switch 153 closed, the coil $CR_7$ is energized to close contacts $RC_{7a-b}$. Closing of the relay contacts $RC_{7b}$ will result in the energization of solenoid 305 which actuates valve $V_6$ to operate mechanisms 151 and 152 to raise the plate 148 of the pusher device 40 so that it will travel over the bags 12 e and 12 f now being received in the marshalling station 38.

Closing of contacts $RC_{7a}$ will result in energization of coil $CR_5$ which will open normally closed contacts $RC_5$ so that coil $CR_6$ cannot be energized, and which will cause energization of the motor control 305 to initiate reverse movement of the pusher device 40 to its "home" position. When the pusher device 40 reaches its "home" position, cam 144 will open limit switch 153 thereby de-energizing coil $CR_7$ to open contacts $RC_{7a}$ to de-energize coil $CR_5$ and thereby deactivate motor control 305 for stopping reverse movement of the pusher device 40 and to open contacts $RC_{7b}$ to de-energize solenoid 306 for causing lowering of the plate 148. By this time the gate 37 will have been raised and the circuit to the lead 294 is now open by the opening of the switch 293 so that closing of the relay contacts $RC_5$ upon de-energized of the coil $CR_5$ of the coil $CR_5$ will not cause energization of coil $CR_6$ until another circuit is completed through one of the cams 273–275 to the lead 295. Also, the next bag 12 e will have been received in the marshalling station 38, and will have actuated the limit switch 138 to cause advancement of the cams 271–278 one position thereby opening the circuit through cam 274.

After the second group of two bags 12 e–f has been received in the marshalling station 38, cam 275 will be in the 6th position to complete a circuit from lead 294 through a relay coil $CR_8$ similar to relay coil $CR_4$, and, when switch 293 is closed, coil $CR_8$ is energized to close normally open contacts $RC_{8a-b}$, which are similar to contacts $RC_{4a-b}$, to (a) "lock in" coil $CR_8$ through contacts $RC_{8a}$ and limit switch 143 to line $L_1$ and (b) to connect line 295 with the line $L_1$ for energizing circuit 296 in the manner described above.

When the cam 144 engages the limit switch 143, forward movement of the pusher device 40 is terminated in the manner described above and reverse movement of the pusher device 40 is initiated. Actuation of the limit switch 143 will also initiate operation of the shuttle plate 44 as will be subsequently described. Moreover, prior to engaging the limit switch 143, the cam 144 will have engaged the limit switch 159 to cause operation of the bumper plate 160 as will be hereinafter described.

The pusher device 40 will be returned to its "home" position and two more bags 12 g–h will be received in the marshalling station 38. The cams 271–278 will be advanced to the 8th position to complete a circuit through the cam 273 to a relay coil $CR_9$, similar to relay coil $CR_4$, so that when limit switch 293 is closed, coil $CR_9$ is energized to close contacts $RC_{9a}$ to "lock in" coil $CR_9$ through contacts $RC_{9a}$ and limit switch 141 to line $L_1$ and to close contacts $RC_{9b}$ to connect line $L_1$ to the common lead 295 and again operate the pusher device 40 in the manner described above. When the cam 144 engages the limit switch 141 forward movement of the pusher device 40 is terminated and reverse movement is initiated to return the pusher device 40 to its "home" position.

After four bags 12 i–l are received in the marshalling station 38 the cam 275 will be in its 12th position to again complete a circuit through the coil $CR_8$ for operating the pusher device 40 in the manner described above.

As shown, two sets of contacts are associated with the limit switch 143. One, as described above, normally connecting line $L_1$ to contacts $RC_{8a}$ and another, normally maintaining open a circuit 308 associated with the cam 276. When the cam 276 is in the 6th position or the 12th position, a circuit is completed through the cam 276 to two circuits, the circuit 308 and a circuit 309. The circuit 309 includes normally open contacts $RC_{10}$ and a solenoid 310 which controls actuation of a valve $V_7$ for operating the bumper plate 160. The circuit 308 includes the normally open contacts of the limit switch 143 and a relay coil $CR_{11}$.

As shown, six other circuits 311–317 are associated with the circuits 308 and 309 and circuits 311–316 are connected in parallel between lines $L_1$ and $L_2$. The circuit 311 includes a pallet actuated limit switch 318 which is mounted between the two plates 198 and 199 of one of the lift members 189, and a relay coil $CR_{12}$ connected in series. The circuit 312 includes limit switch 159 connected in series with a relay coil $CR_{10}$. The circuit 313 includes normally open relay contacts $RC_{11b}$ and relay coil $CR_{13}$ connected in series. The circuit 314 includes normally open relay contacts $RC_{11c}$, relay contacts $RC_{12a}$ normally open relay contacts $RC_{13}$, normally closed relay contacts $RC_{14}$, and relay coil $CR_{15}$ all connected in series. The circuits 315 and 316 are both connected to line $L_1$ through a pair of normally open contacts of the limit switch 297 (which are held open by the shuttle plate 44 while the shuttle plate 44 is in its first position). The circuit 315 also includes normally closed relay contacts $RC_{11d}$, normally open relay contacts $RC_{16}$, relay coil $CR_{14}$ and normally closed relay contacts $RC_{15}$ all connected in series. The circuit 316 also includes normally closed relay contacts $RC_{11e}$ and relay coil $CR_{16}$ connected in series.

The circuit 317 includes a shuttle plate stop limit switch 319 and normally open relay contacts $RC_{11a}$ connected in series between line $L_1$ and the junction between the limit switch 143 contacts and coil $CR_{11}$ in the circuit 308. The limit switch 319 is located on one side of the pallet elevator 46 opposite the gate 62 and is engaged and opened by the shuttle plate 44 when it has completed its travel from its first position to its second position.

Referring now to the operation of the shuttle plate 44, when a second or fourth group of bags 12 is being moved onto the shuttle plate 44, the cam 276 is in the 6th or 12th position closing a circuit between line $L_1$ and circuits 308 and 309 and line $L_1$ voltage is established at the contacts $RC_{10}$. Then, when the cam 144 engages and closes the limit switch 159, the coil $CR_{10}$ is energized and, after a very short time delay, will cause closing of contacts $RC_{10}$ for a predetermined time period. When the contacts $RC_{10}$ are closed, the solenoid 310 is energized to operate a valve $V_7$ controlling the movement of the bumper plate 160 to move the bumper plate 160 to the position shown at 160 a in FIG. 8 and against the outer side of the group of bags 12 being moved onto the shuttle plate 44 and a few inches behind the leading side of the group of bags, thereby guiding the bags into proper position on the shuttle plate 44. The limit switch 159 will be open by the end of the predetermined time period so that, after the predetermined time period, the relay contacts $RC_{10}$ are opened and the solenoid 310 is de-energized to cause the bumper plate 160 to be retracted.

With the cam 276 in the 6th or 12th position connecting line $L_1$ to the circuits 308 and 309, engagement of the limit switch contacts 143 in the circuit 308 by the cam 144 closes the circuit 308 to energize the coil $CR_{11}$. Energization of the coil $CR_{11}$ causes closing of the relay contacts $RC_{11a-c}$ and opening of the relay contacts $RC_{11d-e}$. Closing of the contacts $RC_{11a}$ "locks in" in the coil $CR_{11}$ with line $L_1$ through contacts $RC_{11a}$ and limit switch 319 after the limit switch 143 is opened on reverse movement of the pusher device 40.

Closing of contacts $RC_{11b}$ will close circuit 313 energizing coil $CR_{13}$ which is part of a timed relay such that contacts $RC_{13}$ is in circuit 314 will be closed a short time after coil $CR_{13}$ is energized. So long as the pallet is actuated limit switch 318 is closed by a pallet in the pallet elevator 46 and coil $CR_{12}$ is energized, the contacts $RC_{12a}$ in the circuit 314 will be closed. Also, the contacts $RC_{11c}$ are now closed as a result of the energization of the coil $CR_{11}$. Accordingly, closing of the contacts $RC_{13}$ will close the circuit 314 to energize coil $CR_{15}$ to actuate a motor control 320 to initiate movement of the shuttle plate 44 into the pallet elevator 46. Energization of the coil $CR_{15}$ will also cause opening of the contacts $RC_{15}$ to prevent energization of coil $CR_{14}$ while coil $CR_{15}$ is energized.

When the shuttle plate 44 reaches its second position, it will engage and open the limit switch 319 thereby de-energizing the coil $CR_{11}$. This will open contacts $RC_{11a-c}$, and close contacts $RC_{11d}$ and $RC_{11e}$. Since the shuttle plate 44 has moved away from its "home" position, the limit switch contacts 297 in circuits 315 and 316 are now closed such that, when contacts $rC_{11e}$ are closed in circuit 316, the coil $CR_{16}$ is energized. The coil $CR_{16}$ forms part of a timed relay such that, a short time after the energization of the coil $CR_{16}$, the contacts $rRC_{16}$ in the circuit 315 are closed. However, prior to the closing of the contacts $RC_{16}$ line $L_1$ voltage has already been established at a junction 321, between contacts $RC_{11d}$ and contacts $RC_{16}$, to which a lead 323 is connected. The time delay in closing contacts $RC_{16}$ permits line $L_1$ voltage to be applied to the lead 323 for causing operation of the gate 62 and one of the spreading devices 161 or 162 before the shuttle plate 44 is retracted to wipe a layer off of the shuttle plate 44 over pallet in the pallet elevator 46. In this respect the lead 323 is connected between the junction 321 and two circuits 324 and 325 (FIG. 19B).

As shown in FIG. 19B, the circuit 324 is connected between lead 323 and line $L_2$ and includes a solenoid 327 for actuating a valve $V_7$ for the causing operation of a suitable pneumatic mechanism for lowering and raising the gate 62.

The circuit 325 includes the two cams 277 and 278 and two solenoids 331 and 332. In this respect, the circuit 325 includes the parallel connection, between lead 323 and line $L_2$, of series connected cam 277 and solenoid 331 and series connected cam 278 and solenoid 332. When the cams 271–278 are in the 6th position, the circuit 325 is closed through cam 277 and solenoid 331 and, when the cams 271–278 are in the 12th position, the circuit 325 is closed through cam 278 and solenoid 332. The solenoid 331 controls actuation of a valve $V_9$ for operating the cylinder 172 of the spreading device 161 and the solenoid 332 controls actuation of a valve $V_{10}$ for operating the cylinder 172 of the spreading device 162.

Thus, when the shuttle plate 44 is in the second position the limit switch 297 in circuit 316 is closed and the contacts $RC_{11d}$ are closed, the circuit 324 is closed to energize the solenoid 327 to lower the gate 62, and the circuit 325 is closed through one of the solenoids 277 or 278 to energize one of the solenoids 331 or 332 to cause lowering of one of the spreading devices 161 or 162 depending upon the position of the cams 277 and 278.

Then, when the contacts $RC_{16}$ are closed to close circuit 315, coil $CR_{14}$ is energized to cause operation of a motor control 334 for initiating reverse movement of the shuttle plate 44 to its first position and to open contacts $RC_{14}$ in circuit 314 to prevent energization of coil $CR_{15}$. When the shuttle plate 44 reaches the first position, it will engage the limit switch 297 and open the limit switch 297 contacts in circuits 315 and 316 to stop reverse movement of the shuttle plate 44.

The electrical circuits for controlling the raising and lowering a pallet, e.g., pallet 47 or 63 in the pallet elevator 46, and for operating the pallet dispenser 49 and the conveyors 50 and 52, are indicated at 341–350. The circuit 341 includes a normally open limit switch 352 which is situated adjacent to, and at the downstream end of the conveyor 50, a relay coil $CR_{17}$ and relay contacts $RC_{12b}$ connected in series between lines $L_1$ and $L_2$. The circuit 342 includes a normally closed limit switch 354 which is located at the top of the palate elevator 46, and relay contacts $RC_{17}$ connected in series between line $L_1$, and the junction between limit switch 352 and coil $CR_{17}$. The circuit 343 includes a normally open limit switch 356, which is situated in the layer forming and shuttling station 42 and is adapted to be momentarily closed by the shuttle plate 44 just before it returns to its first position, and a relay coil $CR_{18}$ connected in series between lines $L_1$ and $L_2$. The circuit 344 includes the limit switch 212, which is mounted on one of the lift members 189 (see FIG. 11), and relay contacts $RC_{18}$ connected in series between line $L_1$ and the junction between limit switch 356 and coil $CR_{18}$. The circuit 345 includes a second set of contacts (normally open) associated with the limit switch 354, normally open contacts $RC_{19}$ and a relay coil $CR_{20}$ connected in series between lines $L_1$ and line $L_2$. The circuit 346 includes a limit switch 358, which is situated beneath the pallet dispenser 49, and relay contacts $RC_{20}$ connected in series between line $L_1$ and the junction between contacts $RC_{19}$ and the coil $CR_{20}$. The circuit 347 includes a normally open limit switch 360, which is situated in the upper portion of the pallet elevator 46 and adapted to be momentarily closed by an empty pallet 63 being raised in the pallet elevator 46, just before the empty pallet 63 reaches the predetermined height in the pallet elevator 46, and a relay coil $CR_{19}$ connected in series between lines $L_1$ and $L_2$. The circuit 349 includes a normally open limit switch 362, which is situated at the bottom of the pallet elevator 46, and a relay coil $CR_{21}$ connected in series between lines $L_1$ and $L_2$. The circuit 348 includes a second set of contacts (normally closed) associated with the limit switch 352, and relay contacts $RC_{21}$ connected in series between line $L_1$ and the junction between the limit switch 362 and relay coil $CR_{21}$ in circuit 349. The circuit 350 includes a normally open limit switch 364, which is positioned at the upstream end of the conveyor 52 and adjacent the path of travel of a loaded pallet, a normally closed limit switch 366 at the downstream end of the conveyor 52 and a motor control 368.

The operation of the circuits just described will now be described starting with a loaded pallet.

When a loaded pallet is lowered to the bottom of the elevator 46 it will engage limit switch 362 to energize the coil $CR_{21}$ which then closes the contacts $RC_{21}$ to lock in the coil $CR_{21}$ through closed limit switch contact 352 in circuit 348 to maintain coil $CR_{21}$ energized after limit switch 362 is opened. The coil $CR_{21}$ also controls the operation of a motor control 370 which operates the conveyor 50 to move the loaded pallet to the conveyor 52. It is to be understood that an empty pallet 63 has already been dispensed onto the conveyor 50 beneath the pallet dispenser 49 and is maintaining limit switch 358 open so that, when the conveyor 50 is operated, the empty pallet 63 is carried to the pallet elevator as the loaded pallet is carried to the conveyor 52. At the downstream end of the conveyor 50 the loaded pallet will engage the limit switch 352 and this will open circuit 348 to de-energize the relay coil $CR_{21}$ and the motor control 370 to stop movement of the conveyor 50 and will close circuit 341. Also, at this time, the limit switch 364 is closed by the loaded pallet to energize the motor coil 368 to operate the conveyor 52 to drag the loaded pallet from the conveyor 50. If the loaded pallet is not picket up before it reaches the downstream end of the conveyor 52, it will engage and open the limit switch 366 is stop movement of the conveyor 52.

The distance of travel of the loaded pallet from the pallet elevator 46 to the limit switch 352 is equal to the distance which the empty pallet 63 must be moved from the pallet supply station 48 to the pallet elevator 46. As a result, when the loaded pallet engages the limit switch 352 and causes closing of the limit switch 352 contacts in the circuits 341, the empty pallet 63 will be in the pallet elevator 46 in position to be raised and in a position where the pallet 63 engages and closes limit switch 318 (FIG. 19A) to energize coil $CR_{12}$ to close contacts $RC_{12b}$. With the contacts $RC_{12b}$ closed and the limit switch 352 contacts closed in the circuit 341, the coil $CR_{17}$ is energized to close contacts $RC_{17}$ to "lock in" the coil $CR_{17}$ through circuit 342 to line $L_1$, and to energize a motor control 372 for operating the motor 197 to raise the lift members 189 and the empty pallet 63 resting thereon. Shortly after the coil $RC_{17}$ is energized, the limit switch 352 is opened as the loaded pallet is dragged from the conveyor 50 by the conveyor 52 as a result of the leading end of the loaded pallet engaging the limit switch 364.

Just before the empty pallet 63 reaches the predetermined height, it momentarily closes the limit switch 360 to energize the coil $CR_{19}$. The coil $CR_{19}$ will close contacts $RC_{19}$ and will keep them closed for a short period of time to enable circuit 345 to be closed after the coil $CR_{19}$ is de-energized by the opening of the limit switch 360. When the empty pallet 63 reaches the predetermined height in the pallet elevator 46 it will engage and open the limit switch 354 to de-energize the coil $CR_{17}$ to stop operation of the motor control 372 and thereby stop upward movement of the lift members 189. Engagement of the limit switch 354 will also cause closing of the limit switch 354 contacts in the circuit 345. With the contacts $RC_{19}$ closed when the limit switch 354 contacts in the circuit 345 are closed, the coil $CR_{20}$ is energized to close contacts $RC_{20}$ and to actuate a motor control 374 for operating the drive mechanism 239 of the pallet dispenser 49 to drop the next empty pallet 263 onto the conveyor 50. Since the empty pallet 63 has been moved away from the pallet dispenser 49, the limit switch 358 is now closed, so that closing of contacts $RC_{20}$ will "lock in" the coil $CR_{20}$ with the line $L_1$ through contacts $RC_{20}$ and the closed limit switch 358 after the timed contacts $RC_{19}$ are opened a short time after coil $CR_{19}$ is de-energized upon the opening of limit switch 360. When the lowermost pallet 263 in the pallet dispenser 49 is deposited onto the conveyor 50, it will engage and open the limit switch 358 to de-energize the drive mechanism 239 such that movement of the star wheels 242 is stopped with each star wheel 242 in the position shown in FIG. 16.

When the shuttle plate 44 returns to its first position, after a first layer has been deposited on the empty pallet 63, the shuttle plate 44 engages and closes the limit switch 356 to close the circuit 343 to energize the coil $r_{18}$ (a) to actuate a motor control 376 to operate the motor 197 to lower the lift members 189 and the pallet 63 with one layer 51 thereon, and (b) to close contacts $RC_{18}$ in circuit 344 to "lock in" the coil $CR_{18}$ with line $L_1$ through limit switch 212 to maintain the coil $CR_{18}$ energized after the limit switch 356 is opened. Then, when the limit switch 212 engages one of the cams 217 to open the circuit 344, the coil $CR_{18}$ is de-energized to stop downward movement of the lift members 189. This sequence of operations will be repeated after each succeeding layer is deposited over the pallet 47 until eight layers are loaded on the pallet and the pallet is lowered onto the conveyor 50.

It will be understood that the method of the present invention for assembling layers of the bags 12 on the pallet 47, with the bags 12 in each layer arranged in a predetermined pattern, is accomplished with the palletizer 6 hereinbefore described. In this respect, the method includes the steps of: feeding the bags 12 on the conveyor 26 in the first feeding direction 25 with the longitudinal axis of each bag 12 extending parallel to the direction of travel (and preferably turning selected bags 180° while feeding the bags 12 on the conveyor 26) to the conveyor 32 in the second feeding zone 30, feeding the bags 12 on the conveyor 32 in a second feeding direction 31, 90° to the first feeding direction 25, and with the bags 12 initially positioned on the conveyor 32 with the longitudinal axis of each bag 12 extending transversely of the direction of movement of the conveyor 32, turning selected bags 12, 90° while feeding them on the conveyor 32, sequentially gathering groups of bags 12 at the marshalling station 38, with each group having a predetermined array of bags, moving the first group of bags 12 having gathered at the marshalling station 38, onto the shuttle plate 44 situated in a first position, moving a second group of bags 12 gathered at the marshalling station 38, onto the shuttle plate 44 to form a layer of bags 12 arranged in a predetermined pattern (and, when some selected bags 12 are turned 180°, with the sewn end 16 of each bag 12 extending inwardly of the layer), moving the shuttle plate 44 with the layer so formed thereon to a second position over the pallet 47 in the pallet elevator 46, and wiping the layer 51 off of the shuttle plate 44 with the lowered gate 62 while retracting the shuttle plate 44 to its first position to deposit the layer 51 over the pallet 47, and repeating the above steps seven times but with different groups of bags 12 for each layer until eight layers 51 of bags 12 have been deposited over the pallet 47, the bags 12 in each layer being arranged in a predetermined pattern which is different than the pattern of an adjacent layer so that each bag 12 in each layer contacts two bags in each adjacent layer to establish a frictional interlocking between the layers 51 of bags 12 on the pallet 47.

In one preferred embodiment of the method of the present invention, the selected bags 12 are quickly turned 90° first, by obstructing movement of one side of a selected bag 12 near one end thereof with the deflector member 112, second, by moving the guide member 116 in a forward direction parallel to the second feeding direction 31 and into engagement with the other side of the bag 12 and then along the other side of the bag 12 toward the other end of the bag 12, while still obstructing the one side of the bag 12 near the one end thereof to turn the bag 90°, and third, by moving the guide member 116 in a reverse direction 180° to the second feeding direction 31 and into engagement with the other side of the bag 12 and then along the other side of the bag 12 toward the one end of the bag 12 while continuing to engage the one side of the bag 12, at the point where it was initially obstructed, to align the bag 12 with its longitudinal axis parallel to the second feeding direction 31.

Also in one preferred embodiment of the method of the present invention, where each layer of bags 12 arranged on the shuttle plate 44 includes two bags 12 arranged end to end in abutting relationship and four bags 12 arranged side by side, with the longitudinal extent of the two bags 12 abutting each other end to end being less than lateral extent of the four bags 12 arranged side by side, the method further includes the step of spreading apart the abutting ends of the two bags arranged end to end with one of the spreading devices 161, 162 while wiping the layer 51 off of the shuttle plate 44 onto the pallet 47 so that the outer ends of the bags 12 arranged end to end will be in line with the outer facing sides respectively of the outer two of the bags 12 arranged side by side. In this way, the corners of each layer deposited on the pallet 47 are "squared" to provide a stable stack of layers 51 on the pallet 47.

It will be apparent that certain variations and modifications can be made to the palletizer 6 of the present invention without departing from the scope of the invention. For example many of the limit switches could be replaced with proximity switches or photo-cells.

Additionally, it will be understood from the foregoing description, that the method and apparatus of the present invention have a number of advantages, some of which have been described above and others of which are inherent in the invention. Accordingly, the scope of the present invention is only to be limited as necessitated by the following claims.

What We claim is:

1. Method for assembling at least one layer of packages on a pallet with the packages in each layer arranged in a predetermined pattern, said method comprising the steps of: conveying packages in a first direction with each package oriented in a given direction; conveying said packages in a second direction to a marshalling station; turning selected packages while they are being conveyed in said second direction; sequentially gathering groups of said packages at said marshalling station; moving the first group of packages gathered at said marshalling station onto a plate while it is in a first position; moving a second group of packages gathered at said marshalling station onto said plate while it is in said first position to form a layer of packages arranged in a predetermined pattern; moving said plate with said layer thereon to a second position over a pallet; and wiping said layer off of said plate while retracting said plate to said first position to deposit said layer on said pallet; each layer of packages arranged on said plate including two packages arranged end to end in abutting relationship and a plurality of other packages arranged side by side, the longitudinal extent of said two packages abutting each other end to end being less than the lateral extent of said other packages arranged side by side, said method further including the step of spreading apart said abutting ends of said two packages arranged end to end while wiping said layer off of said plate onto said pallet whereby the outer ends of said packages arranged end to end on said pallet will be in line with the outer facing sides, respectively, of the outer two packages of said other packages arranged side by side on said pallet.

2. The method of claim 1 wherein each package conveyed in said second direction is initially positioned with one axis thereof extending transversely of said second direction, and each selected package is quickly turned, first, by obstructing movement of one side of a selected package near one end thereof and, second, by moving a guide member in a forward direction substantially parallel to said second direction and into engagement with the other side of said package and then along said other side toward the other end of said package while obstructing said one side near said one end to turn said package.

3. The method of claim 2 including the step of moving said guide member in a reverse direction into engagement with said other side of said package and then along said other side toward said one end of said package, while engaging said one side at said point where it was obstructed, to align said package with said one axis of said package substantially parallel to said second direction.

4. A method for quickly assembling packages in at least one layer having a predetermined pattern, said method including the steps of: conveying said packages to a layer forming station with a given axis of each package extending transversely of the direction it is being conveyed at one point in time during the conveying thereof; quickly turning selected packages at said point in time while they are being conveyed, first, by obstructing forward movement of one side of a selected package near one end thereof, and second, by moving a guide member in a forward direction substantially parallel to said conveying direction and into engagement with the other side of said package and then along said other side of said package toward the other end of said package while obstructing said one side of said package near said one end thereof to turn said package; and sequentially forming said packages into a layer having a predetermined pattern at said layer forming station.

5. The method of claim 4 wherein the step of quickly turning said selected bags includes the further step of moving said guide member in a reverse direction and into engagement with said other side of said package and then along said other side toward said one end of said package, while engaging said one side of said package at said point where it was obstructed, to align said package with said given axis of said package substantially parallel to said conveying direction.

* * * * *